US008975581B2

(12) United States Patent
Verdu Galiana

(10) Patent No.: US 8,975,581 B2
(45) Date of Patent: Mar. 10, 2015

(54) ION TRAP

(71) Applicant: The University of Sussex, Brighton East Sussex (GB)

(72) Inventor: Jose Luis Verdu Galiana, Brighton East Sussex (GB)

(73) Assignee: The University of Sussex, East Sussex (GB)

( * ) Notice: Subject to any disclaimer, the term of this patent is extended or adjusted under 35 U.S.C. 154(b) by 0 days.

(21) Appl. No.: 14/346,007

(22) PCT Filed: Sep. 20, 2012

(86) PCT No.: PCT/EP2012/068530
§ 371 (c)(1),
(2) Date: Mar. 20, 2014

(87) PCT Pub. No.: WO2013/041615
PCT Pub. Date: Mar. 28, 2013

(65) Prior Publication Data
US 2014/0332680 A1   Nov. 13, 2014

Related U.S. Application Data

(63) Continuation of application No. 13/237,620, filed on Sep. 20, 2011, now Pat. No. 8,362,423.

(51) Int. Cl.
*H01J 49/20* (2006.01)
*H01J 49/00* (2006.01)

(52) U.S. Cl.
CPC ............. *H01J 49/20* (2013.01); *H01J 49/0031* (2013.01)
USPC .................. 250/292; 250/396 R; 250/396 ML

(58) Field of Classification Search
USPC ........................ 250/292, 290, 396 R, 396 ML
See application file for complete search history.

(56) References Cited

U.S. PATENT DOCUMENTS 6,750,448 B2 * 6/2004 Turecek et al. ............... 250/281

* cited by examiner

*Primary Examiner* — Kiet T Nguyen
(74) *Attorney, Agent, or Firm* — Sheridan Ross P.C.

(57) ABSTRACT

An ion trap comprising: a first array of magnetic elements arranged to generate a first magnetic field with a degree of homogeneity; and an array of electrodes arranged to generate an electrostatic field including a turning point in electrical potential at a location where the magnetic field has a substantially maximum degree of homogeneity; wherein the array of electrodes is planar and parallel to the direction of the magnetic field at the location; and wherein a primary first magnetic element is arranged to generate a first component of the first magnetic field and other first magnetic elements are arranged to generate compensating components of the first magnetic field that reduce the gradient, the curvature and higher order derivatives of the first component of the first magnetic field at the location where the first magnetic field has the substantially maximum degree of homogeneity.

30 Claims, 30 Drawing Sheets

＃ ION TRAP

FIELD OF THE DISCLOSURE

The disclosure relates to an ion trap, and to a mass spectrometer and a component of a superconducting microwave quantum circuit incorporating the ion trap.

BACKGROUND TO THE DISCLOSURE

An ion trap is an apparatus used to confine or isolate a charged particle, such as an electron. One class of such apparatus is known as Penning traps. In general a Penning trap uses a magnetic field and an electrostatic field together to trap charged particles. The magnetic field causes the charged particles to perform a rotational movement with the direction of the magnetic field being the axis of the rotation. This effectively confines the particles to a plane normal to the direction of the magnetic field. The electrostatic field is arranged to confine the charged particles at a location along the direction of the magnetic field, by providing a potential well for the particle at the desired location.

In order for a Penning trap to confine a charged particle effectively and to be useful for performing measurements on the trapped particle, it is important both for the magnetic field to be spatially homogeneous and for the electrostatic field to be hyperboloid at the location the charged particle is to be trapped. This places constraints in the design of a conventional Penning trap and its variants, generally making them complex and expensive.

In general, the required electrostatic potential well is created by a set of metallic electrodes with appropriate static voltages applied to them. Conventional Penning traps are fabricated with three-dimensional (3D) electrodes. The first Penning trap used electrodes with the shapes of hyperboloids of revolution. This guarantees that the electrostatic potential well nearly follows the ideal shape of a harmonic potential well. Penning traps with the electrodes of that shape are called "hyperbolic Penning traps". In 1983 a Penning trap with electrodes with the shapes of cylinders was introduced. This is now a common type of conventional Penning trap and it is known as the "cylindrical Penning trap".

Conventional Penning traps employ a solenoid, usually superconducting, to create the required magnetic field. Solenoids are big, unscalable and very expensive structures. In order to achieve the required spatial homogeneity solenoid systems include, besides the main coil, additional shim-coils with carefully chosen shim-currents. The fields created by the shim-coils cancel inhomogeneities of the bulk magnetic field in a big volume enclosing the position where the charged particles are trapped. The time stability of the magnetic field is achieved with passive coils. These damp any fluctuations of the field caused by external magnetic noise of whatever origin. Normal conducting solenoids are too unstable for high precision mass spectrometry and for quantum computation applications with trapped electrons. Superconducting solenoids are typically room-size devices. The magnetic field in the trapping region, i.e. the region in the immediate vicinity of the trapped charged particles, cannot be isolated within a superconducting shield-box. The latter is the most effective protection against external magnetic noise. The temperature of the room-size superconducting solenoid system cannot be regulated with a stability and accuracy below the level of 1 K. This is due to the big size of the solenoid, which requires stabilizing the temperature of the room where the solenoid with the ion trap is located.

SUMMARY OF THE DISCLOSURE

According to a first aspect of the disclosure, there is provided an ion trap comprising:

a first array of magnetic elements arranged to generate a first magnetic field with a degree of homogeneity; and an array of electrodes arranged to generate an electrostatic field including a turning point in electrical potential at a location where the magnetic field has a substantially maximum degree of homogeneity;

wherein the array of electrodes is planar and parallel to the direction of the magnetic field at the location; and wherein a primary first magnetic element is arranged to generate a first component of the first magnetic field and other first magnetic elements are arranged to generate compensating components of the first magnetic field that reduce the gradient and curvature of the first component of the first magnetic field at the location where the first magnetic field has the substantially maximum degree of homogeneity.

By arranging the array of electrodes to be planar, the electrodes can be fabricated much more easily than in a conventional Penning trap in which the electrodes are arranged as cylinders or hyperboloids of revolution. Furthermore, by arranging the array of electrodes parallel to the direction of the magnetic field, the turning point in the electrical potential can be made symmetric with respect to the magnetic field axis, thereby maintaining the harmonicity of the electrostatic potential well and therefore the usefulness of the trap.

One main magnetic element, which may be centrally positioned within the magnetic element array, may provide the bulk magnetic field at the trapping position above the main electrode, which may be centrally positioned in the electrode array. Additional magnetic elements may be in pairs and hence are below termed "shim-pairs". Each magnetic element of a shim-pair may be placed symmetrically at each side of the main central magnetic element. The shim elements ensure that the magnetic field is sufficiently homogeneous at the desired location, as the different magnetic elements in the row compensate for the inhomogeneities of the magnetic field. It is also possible for the shim-pairs to be in a different plane or planes to the central magnet.

The elimination of magnetic inhomogeneities may be optimized empirically, i.e. the shimming magnetic fields may be adjusted until the desired degree of overall magnetic field homogeneity is achieved at the trapping position above the central electrode in the row. The applied currents or the applied magnetisation of the shim-pairs can always be chosen to eliminate the magnetic inhomogeneities up to some degree, which depends on the number of employed shim-pairs. The shimming process may ensure that the magnetic field is sufficiently homogeneous at the trapping position above the central electrode in the middle of the row. The magnetic sensor used for probing and optimising the magnetic field at the trapping region may be the trapped particle itself, most conveniently, but not exclusively, an electron. This is the one of the most sensitive magnetic sensors available in nature.

The magnetic element array may comprise a row of magnetic elements, which row extends in the same direction as the row of electrodes. The magnetic elements may be either wires made of normal conducting or superconducting materials or permanent magnets fabricated with conventional ferromagnets or permanently magnetised superconductors.

It is possible for the electrodes of the array to be at different heights within the array or to have contoured surfaces. However, it is preferred that the electrodes of the array each have surfaces facing the location where the magnetic field is substantially homogeneous and that these surfaces are substantially coplanar.

The array of electrodes may comprise a row of three or more electrodes, which row is arranged to be parallel to the direction of the magnetic field at the location where the magnetic field is substantially homogeneous. Typically, the row comprises five electrodes.

Usually, the lengths of the electrodes along the direction of the row are such that an electrode in the middle of the row is shortest and electrodes at the ends of the row are longest. This facilitates the electrostatic equipotential lines to become hyperbolic along the length of the row (that is also the direction of the magnetic field), above the central electrode in the row.

The electrode array may comprise a guard electrode on each side of the row. Typically, the guard electrodes are coupled to ground, but it is also possible for an electric potential to be applied to the guard electrodes. The guard electrodes ensure that the electric field has a well defined turning point above the electrode in the middle of the row in a direction across the width of the row. Moreover, the guard electrodes help to shape the electric field such that the trapped ion finds an equilibrium position in the electric field at a non-zero height above the electrode in the middle of the row.

The guard electrodes can overlap the electrodes of the row, without intersecting them. This can reduce the effect of the insulating gaps between any neighbour electrodes on the shape of the electric filed.

Helpfully, the array of electrodes may be provided on a substrate and the magnetic field generator is provided on the same substrate. Indeed, according to a second aspect of the disclosure there is provided an ion trap comprising:

a substrate;

a magnetic field generator provided on the substrate and arranged to generate a magnetic field; and an array of electrodes provided on the same substrate and arranged to generate an electrostatic field including a turning point in electrical potential at a location where the magnetic field is substantially homogeneous, wherein the array of electrodes is planar and parallel to the direction of the magnetic field at the location.

This significantly simplifies fabrication of the ion trap, by allowing the magnetic field generator to be provided close to the electrode array. This eliminates the need for expensive superconducting coils to generate a sufficiently strong magnetic field from a remote location, as in conventional Penning traps, as the magnetic field close to the magnetic field generator can be utilised. It can also mean that the ion trap can be manufactured as a small scale integrated electronic device, for example using thin or thick film fabrication techniques.

The electrode array may be provided on a top surface of the substrate and the magnetic field generator provided below the electrode array.

The ion trap has a number of useful applications. In particular, there is provided a mass spectrometer comprising the ion trap, and there is provided a building block for microwave quantum circuits.

DETAILED DESCRIPTION OF THE PREFERRED EMBODIMENTS

Figure 1:
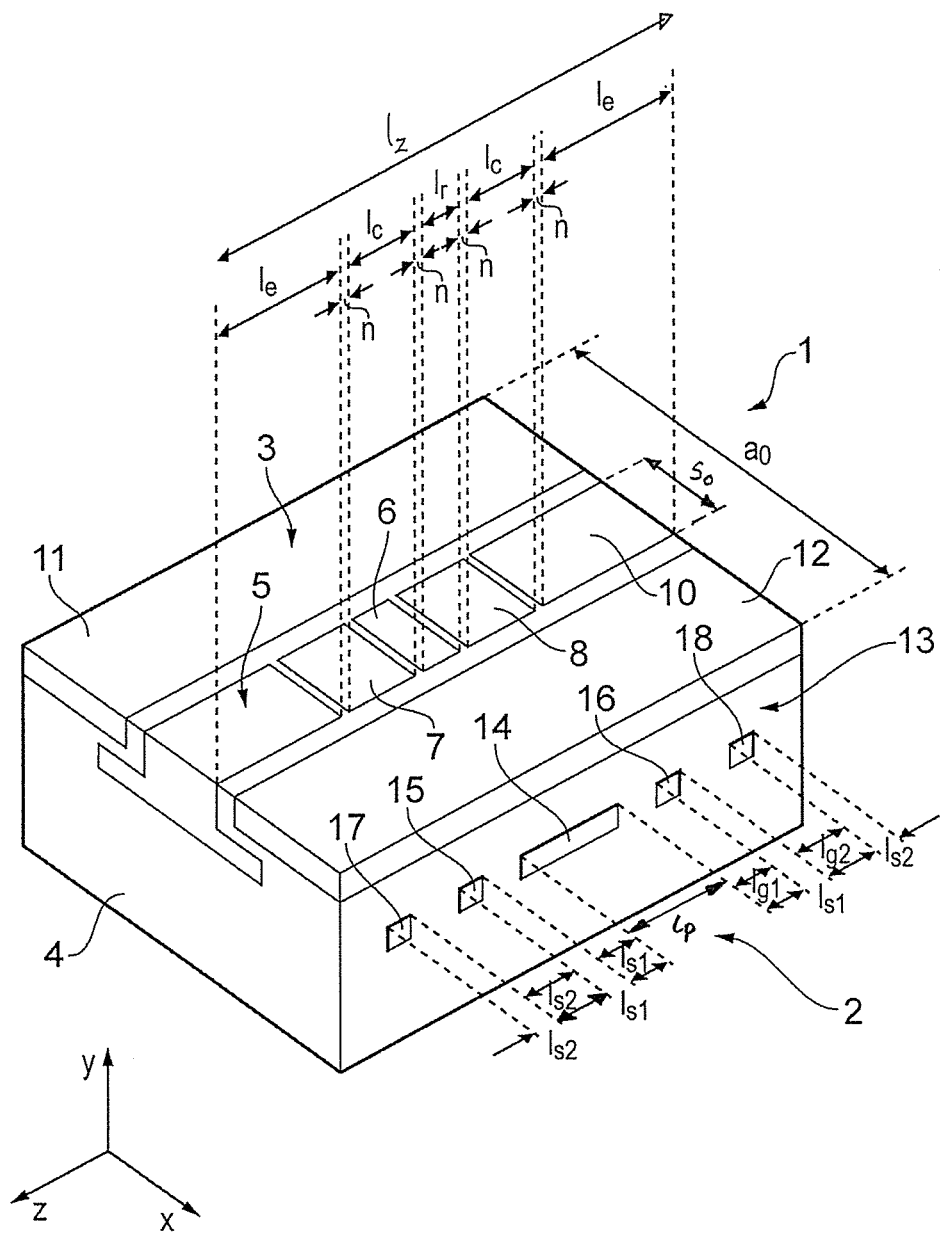
FIG. 1 is a schematic illustration of an ion trap according to a first preferred embodiment.
Figure 2:
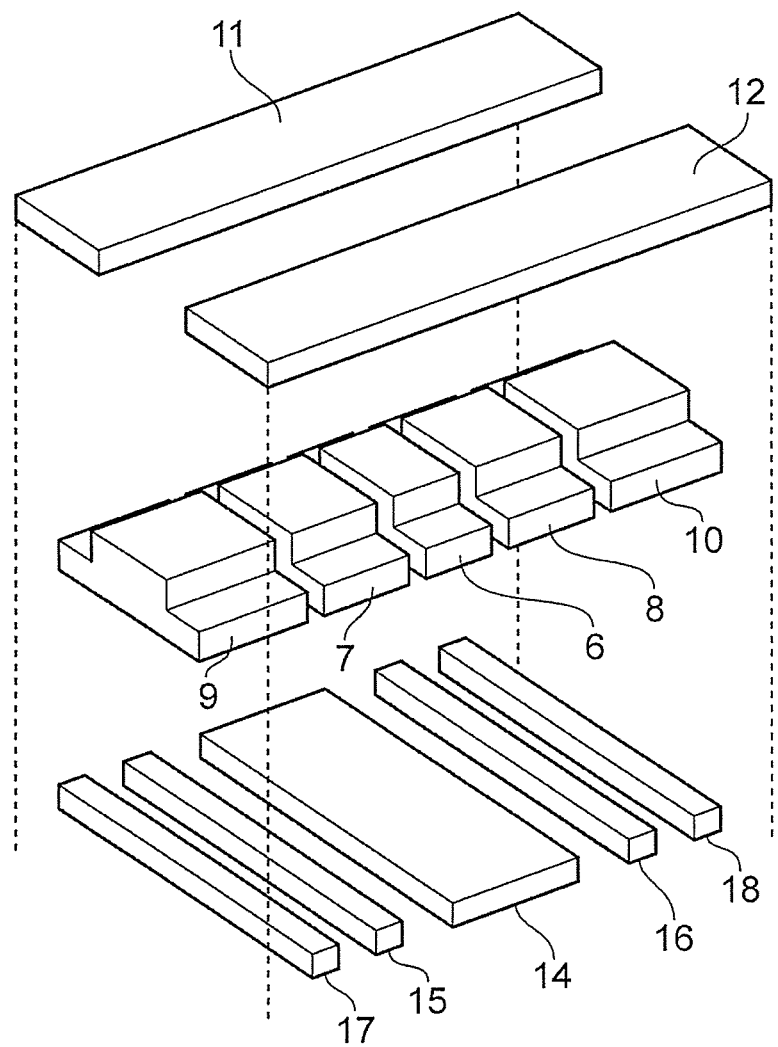
FIG. 2 is an exploded schematic illustration of the ion trap omitting a substrate.

Referring to FIGS. 1 and 2, an ion trap 1 comprises an array 2 of magnetic elements and an electrode array 3 provided on a substrate 4. The ion trap 1 is effectively a flat variant of a conventional Penning trap, and can be referred to as a Penning trap in the context of the general principles of its operation, although not in terms of its specific structure, which differs significantly from conventional three-dimensional traps. The term "coplanar waveguide Penning trap" has been coined to describe the ion trap 1.

It should be noted that the ion trap 1 is described in the context of a trap for negatively charged ions, in particular an electron, as this is likely to be the most common use of the ion trap 1 for applications as a building block of microwave quantum circuits. However, the skilled person will recognise that the trap can equally be used for trapping positively charged ions by reversing the polarity of the electrode array 3.

In this embodiment, the substrate 4 is a dielectric material suitable for use as a waveguide for microwaves, for example in the range 1 to 30 GHz. Suitable materials are sapphire or quartz or other insulators with low dielectric losses.

The electrode array 3 comprises a ring electrode 6, two compensation electrodes 7, 8 and two end cap electrodes 9, 10 arranged in a row 5. The ring electrode 6 is in the middle of the row 5 and the end cap electrodes 9, 10 are at the ends of the row 5. The compensation electrodes 7, 8 are each between a respective end cap electrode 9, 10 and the ring electrode 6. In other embodiments, the compensation electrodes 9, 10 are omitted and the row 5 includes only the ring electrode 6 and end cap electrodes 9, 10. On each side of the row 5 is a guard electrode 11, 12. These guard electrodes are also known as "ground planes" when the trap is viewed simply as a section of a coplanar waveguide. The coplanar waveguide is a flat transmission line widely used in microwave applications.

Wires (not shown) are provided so that electric potential can be applied to the electrodes 6, 7, 8, 9, 10, 11, 12. In this embodiment, the two compensation electrodes 7, 8 are electrically coupled to one another by the wires, the two end cap electrodes 9, 10 are electrically coupled to one another by the wires and the two guard electrodes 11, 12 are electrically coupled to one another by the wires so that the respective electric potentials $V_c$, $V_e$, $V_g$ can be applied to the pairs of compensation electrodes 7, 8, end cap electrodes 9, 10 and guard electrodes 11, 12.

The electrodes 6, 7, 8, 9, 10, 11, 12 can be made of any conducting material, such as gold or copper. Alternatively, they may be of a low temperature superconductor. Typically a conducting material is sufficient when the ion trap 1 is used as a mass spectrometer, whereas a superconducting material is appropriate when the ion trap is used in microwave quantum circuits (circuit-QED) applications.

The electrode array 3 has a length $l_z$ in the direction of the row 5 of electrodes 6, 7, 8, 9, 10, 11, 12 and a width $a_0$. Within this overall length $l_z$, the ring electrode 6 has a length $l_r$ in the direction of the row 5, the compensation electrodes 7, 8 each have length $l_c$ in the direction of the row 5 and the end cap electrodes 9, 10 each have length $l_e$ in the direction of the row 5. Typically, the length $l_r$ of the ring electrode 6 is greater than or equal to 0.1 mm, the length $l_c$ of the compensation electrodes 7, 8 is less than or equal to 2 mm and the length of the end cap electrodes between 0.5 mm and 10 mm inclusive. The lengths of the electrodes and the width are most conveniently chosen such that they allow for the existence of a tuning ratio as in FIG. 7. This figure shows a useful interval of trapping heights $y_0 \in [y_0^{minimum}, y_0^{maximum}]$ where an optimal tuning ratio exists $T_c^{opt}$, where $T_c^{opt} = V_c/V_r$ is the ratio of the voltage applied to the compensation electrodes to the voltage applied to the ring. With the optimal tuning ratio $T_c^{opt}$ the first and second order deviations of the trapping potential well form the ideal harmonic (parabolic) shape are eliminated. This guarantees that the trapped particle very closely behaves as an ideal harmonic oscillator, with a well-defined oscillation frequency. The dimensions of the electrodes of the ion trap are chosen such that $T_c^{opt}$ exists within a particular, desired useful trapping interval $[y_0^{minimum}, y_0^{maximum}]$. The interval can be defined arbitrarily by the user and depends on the particular application envisaged. It is not possible to give analytical mathematical formulas to obtain the lengths and width of the electrodes when one particular useful interval has been chosen. Those dimensions must be obtained numerically. Different solutions may exist. For mass spectrometry and microwave quantum circuits applications the optimal solution is that which allows to cancel simultaneously all electrostatic anharmonicities up the sixth order $C_{012} = C_{004} = C_{006} = 0$. The procedure is as follows: once the dimensions of the trap electrodes have been found for a particular useful trapping interval $[y_0^{minimum}, y_0^{maximum}]$, the length of the correction electrodes $l_c$ can be slightly varied until the optimal solution is found. This is described in the example of FIGS. 12 and 13. The width of the electrodes and/or the material of the substrate can also be optimized such that the input impedance of the ion trap is 50 Ohm, as usually required in microwave quantum circuits.

The electrodes 6, 7, 8, 9, 10, 11, 12 have lengths $l_r$, $l_c$, $l_e$ and are arranged in the row 5 such that the row 5 is symmetrical about an imaginary line that bisects its length. In other words, the row 5 is symmetrical lengthwise about a centre line of the ring electrode 6.

The electrode array 3 is planar, in the sense that the electrodes 6, 7, 8, 9, 10, 11, 12 are all arranged side by side, facing in the same direction. In this embodiment, the electrodes 6, 7, 8, 9, 10, 11, 12 are provided on a top surface of the substrate 4 and themselves each have top surfaces that are in the same plane. In other words, the top surfaces of the electrodes 6, 7, 8, 9, 10, 11, 12 are coplanar. However, in other embodiments, the top surfaces of the electrodes 6, 7, 8, 9, 10, 11, 12 are at different heights or are contoured, whilst the electrode array 3 still remains planar overall.

The magnetic element array 2 comprises a row 13 of a primary magnetic element 14 and four shim magnetic elements 15, 16, 17, 18. The primary magnetic element 14 is in the middle of the row 13 and the shim magnetic elements 15, 16, 17, 18 are positioned symmetrically on each side of the primary magnetic element 14. The primary magnetic element 14 has a length $l_p$ in the direction of the row 13, the shim magnetic elements 15, 16 adjacent the primary magnetic element 14 each have length $l_{s1}$ in the direction of the row 13 and the shim magnetic elements 17, 18 at the ends of the row 13 each have length $l_{s2}$ in the direction of the row 13. The primary magnetic element 14 is spaced apart from each of the shim magnetic elements 15, 16 adjacent the primary magnetic element 14 by gaps having length $l_{g1}$ and the shim magnetic elements 15, 16 adjacent the primary magnetic element 14 are spaced apart from the shim magnetic elements 17, 18 at the ends of the row 13 by gaps having length $l_{g2}$. The length of the primary magnetic element 14 denoted by $l_p$, is typically, but not necessarily, of the order of $l_p \div l_r + 2l_c$ (see FIG. 1). Such values of $l_p$ help improve the homogeneity of the magnetic field in the trapping region. The cross section of the primary magnetic element 14 is $l_p \times w_p$, where the thickness of the magnetic element 14 is $w_p$, with values for $w_p$ above 0.01 mm and below 2 cm. The choice depends on the type of material employed and the desired maximum value for the strength of the magnetic field at the position where the charged particles are trapped.

The first shim-pair comprises the magnetic elements 15 and 16. Both are identical in dimensions and placed symmetrically at both sides of the magnetic element 14. In FIGS. 1 and 2 the magnetic elements 15 and 16 have the same thickness as the element 14: $w_p$. In general, the thickness of 15 and 16 can be chosen different to $w_p$. If chosen different, then, most conveniently, that thickness will be grater than $w_p$. This is so in order to guarantee that the current or magnetisation of the magnetic elements 15 and 16 does not overcome the critical values for current density and/or critical magnetic field of the superconducting materials employed for their fabrication. If fabricated with not superconducting materials, the same argument applies, however instead of parameters such as the critical current density and/or critical magnetic field the maximum value of current density or maximum polarisation of the employed materials are the relevant physical constraints. The length of the magnetic elements 15 and 16 is $l_{s1}$ (see FIG. 1). There is no general constraint on the value of $l_{s1}$. It may be convenient to choose $l_{s1}$ smaller than the length of the magnetic element 14 $l_p$, in order to have the total length of the total magnetic array (see FIG. 2) as small as possible. This choice may be convenient when more shim-pairs, such as the magnetic elements 17 and 18, are implemented. Typically $l_{s1} \leq 1$ cm and $l_{s1} \geq 0.01$ mm. The separation of the magnetic elements 15 and 16 to the element 14 is denoted $l_{g1}$. Typically 0.001 mm $\leq l_{g1} \leq 1$ cm.

In this embodiment, the magnetic elements 14, 15, 16, 17, 18 are each superconducting wires coupled so as to convey an electric current perpendicular to the length of the row 13 and parallel to the plane of the electrode array 3. In other embodiments, the magnetic elements 14, 15, 16, 17, 18 are each high temperature superconducting magnets. In either case, the magnetic elements 14, 15, 16, 17, 18 are arranged to generate a magnetic field that has a direction substantially parallel to the row 5 of electrodes 6, 7, 8, 9, 10 and that is substantially homogeneous at a location above the ring electrode 6.

Ignoring the outer edges of the electrode array 3 and instead assuming that the outer edges extend to infinity, for simplicity, the electric field generated by the electrode array 3 can be expressed as:

$$\phi(x,y,z) = V_r \cdot f_r(x,y,z) + V_c \cdot f_c(x,y,z) + V_e \cdot f_e(x,y,z) + f_{gaps}(x,y,z|V_r,V_c,V_e) \quad (1)$$

where $V_r$, $V_c$ and $V_e$ represent DC voltages applied to the ring electrode 6, the compensation electrodes 7, 8 and the end cap electrodes 9, 10, respectively. The functions $f_r$, $f_c$ and $f_e$ represent the contribution to the electrostatic field of the ring electrode 6, the compensation electrodes 7, 8 and the end cap electrodes 9, 10 respectively. These functions $f_r$, $f_c$ and $f_e$ depend only on the dimensions of the electrodes 6, 7, 8, 9, 10. The function $f_{gaps}$ represents the contribution to the electrostatic field of the gaps between the electrodes 6, 7, 8, 9, 10 and depends on both the dimensions of the gaps and the DC voltages $V_r$, $V_c$ and $V_e$ applied to the electrodes 6, 7, 8, 9, 10.

The basic functioning of the ion trap 1 can be illustrated by computing an example using equation (1). For this purpose, we choose $l_r$=0.9 mm, $l_c$=2.0 mm, $l_e$=5.0 mm, $\eta$=0.1 mm and width $S_0$=7.0 mm and the voltages applied to the electrodes 6, 7, 8, 9, 10, 11, 12 are $V_r$=−1 V, $V_c$=−1.15 V, $V_e$=−4 V and $V_g$=0 V. These voltages allow for capturing electrons or any negatively charged particles around a position directly above the centre of the ring electrode 6, which is defined in a Cartesian reference frame at x=0, y=$y_0$, z=0. It is noteworthy that the end cap electrodes 9, 10 are not grounded. The relationship between the voltages applied to the electrodes 6, 7, 8, 9, 10 in the row 5 can generally be defined as:

$$|V_e| > |V_c| \geq V_r| \quad (2)$$

in order that there is an equilibrium position at a distance $y_0 > 0$ above the surface of the ring electrode 6.

Figure 3:
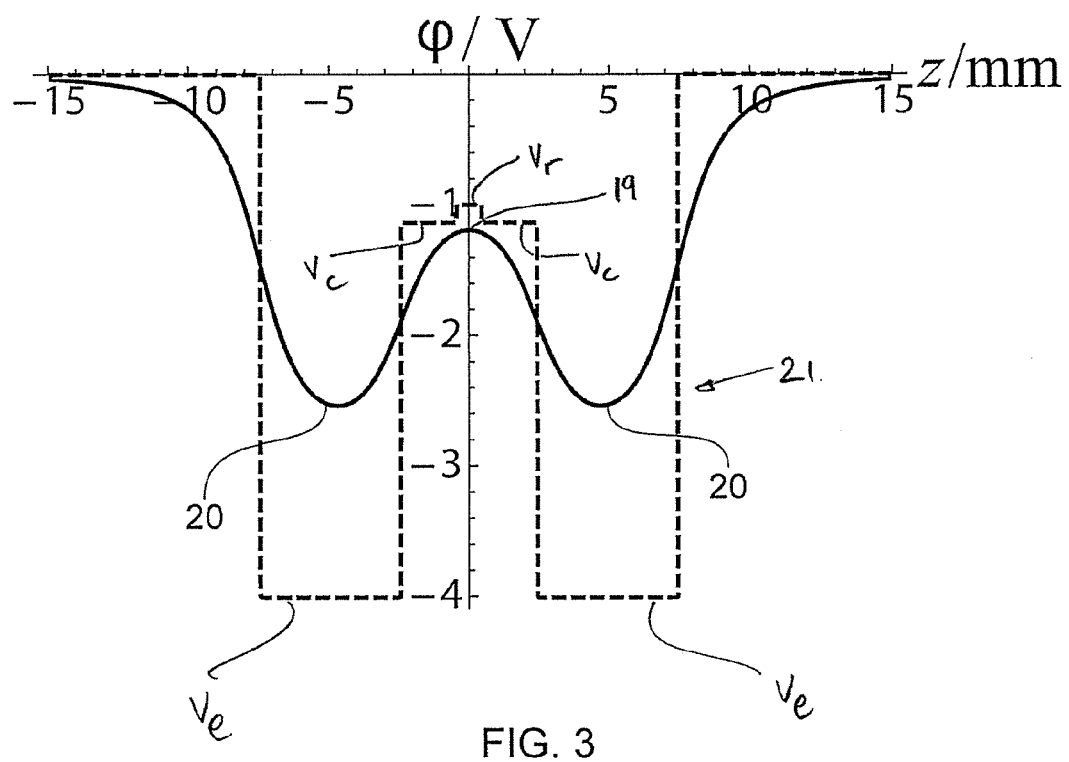
FIG. 3 is a graphical illustration of electrostatic potential along the length of a row of electrodes of the ion trap.
Figure 4:
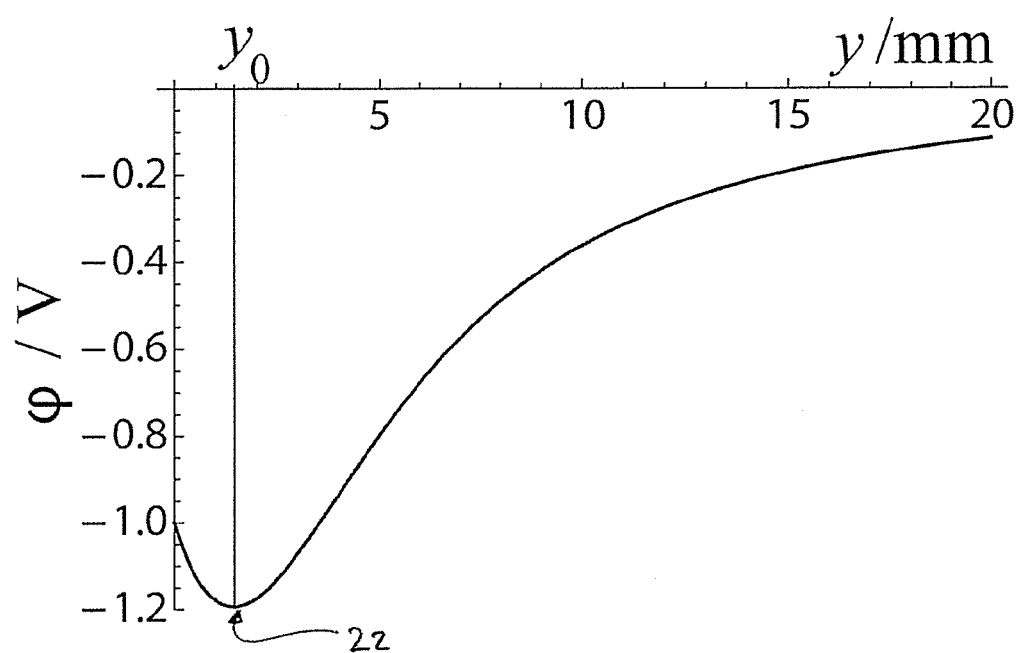
FIG. 4 is a graphical illustration of electrostatic potential across the width of the row of electrodes on the ion trap. That is in the direction parallel to the normal of the plane where the electrodes are sitting. It is the direction along the "y" axes, as defined in FIG. 1.

Referring to FIG. 3, the electric potential at distance $y_0$ (~1.19 mm in this example) above the ring electrode 6 varies in the direction z along the length of the row 5 of electrodes 6, 7, 8, 9, 10, having a maxima 19 above the centre of the ring electrode 6 and minima 20 on each side of the ring electrode 6. In FIG. 4, the variation of $\phi$ along the vertical axes y is shown.

The trapping height $y_0$ is determined by the equality $$\frac{\partial \phi(0,y,0)}{\partial y} = 0.$$

If the insulating gaps are vanishingly small, $\eta \to 0$, then $f_{gaps} \to 0$. With this approximation, the equation for calculating $y_0$ is:

$$\frac{\partial f_r}{\partial y} + T_c \cdot \frac{\partial f_c}{\partial y} + T_e \cdot \frac{\partial f_e}{\partial y} = 0 \quad (2)$$

This introduces a tuning ratio $$T_c = \frac{V_c}{V_r}$$

and an end-cap to ring ration $$T_e = \frac{V_e}{V_r}.$$

Equation 2 shows that the trapping height depends only on voltage ratios $T_c$, $T_e \to y_0 = y_0(T_c, T_e)$. This formal dependence holds also for the less restrictive case that the gap $\eta$ is small "enough", $\eta \ll l_r$, $l_c$, $l_e$, $S_0$. Equation 2 cannot be solved analytically for $y_0$, only numerical values can be obtained.

The series expansion of $\phi(x,y,z)$ around the equilibrium position (x,$y_0$,z), including terms up to the $4^{th}$ order, has the following form:

$$\phi(x,y,z) = \phi(0,y_0,0) + C_{002}z^2 + C_{200}x^2 + C_{020}(y-y_0)^2 + C_{012}z^2(y-y_0) + C_{210}x^2(y-y_0*C030y- y03*C202z2x2*C022z2y-y02*C220x2y- y02*C004z4 + C400x2 + C040y-y04 \quad (3)$$

The expansion coefficients are defined by $$C_{ijk} = \frac{1}{i!j!k!} \cdot \frac{\partial^{i+j+k} \phi(x, y, z)}{\partial x^i \partial y^j \partial z^k} \quad (5)$$

(evaluated at $(0, y_0, 0)$). The symmetry of $\phi(x, y, z)$ along $\hat{u}_x$ and $\hat{u}_z$ implies that all $C_{ijk}$ with odd i and/or odd k vanish. The $C_{ijk}$ coefficients define to a great extent the performance of the trap. They (or equivalent ones) have been studied in detail for three-dimensional cylindrical, hyperbolic and toroidal Penning traps. Moreover, as for equation 2, if the slits between electrodes are small "enough", then $C_{ijk}$ scale linearly with the ring voltage $C_{ijk} = V_r \cdot c_{ijk}$, where every $c_{ijk} = c_{ijk}(T_c, T_e)$ depends only on $T_c$ and $T_e$.

Plugging the series expansion 3 into Laplace equation, $\nabla^2 \phi(x,y,z)=0$, the following equalities can be obtained:

$$C_{002} + C_{020} + C_{002} = 0;\ 3C_{030} + C_{210} + C_{012} = 0 \quad (4)$$

$$6C_{400} + C_{220} + C_{202} = 0;\ 6C_{040} + C_{220} + C_{022} = 0;\ 6C_{004} + C_{202} + C_{022} = 0 \quad (5)$$

In the case of a 3D hyperbolic or cylindrical trap, the coordinates x and y are undistinguishable $\Rightarrow C_{200} = C_{020}$. Thus, equation 4 (left) reduces to $C_{002} = -2C_{020}$. From it, the potential of an ideal Penning trap arises $\Rightarrow \phi = C_{002}(z^2 - (x^2 + (y - y_0)^2)/2)$. In the case of the coplanar waveguide Penning trap (short CPW-trap) though, x and y are distinguishable and the curvatures $C_{200}$ and $C_{020}$ are not identical: $C_{200} \neq C_{020}$. Hence the general form of the quadrupole potential, i.e. including terms only up to the second order, is:

$$\phi_{quad} = C_{002}\left(z^2 - \frac{(x^2 + (y-y_0)^2)}{2}\right) + \frac{1}{2}C_{002}\in(x^2 - (y-y_0)^2). \quad (6)$$

The ellipticity parameter is given by $$\in = \frac{C_{200} - C_{020}}{C_{002}}.$$

In general, $\in \neq 0$, and the CPW-trap is therefore an elliptical Penning trap.

The motion of a particle in the ideal elliptical trap of equation 6 has been calculated analytically (M. Kretzschmar 2008). The reduced cyclotron $\omega_p = 2\pi \nu_p$, magnetron $\omega_m = 2\pi \nu_m$ and axial $\omega_z = 2\pi \nu_z$ frequencies of the trapped particle—with charge q and mass m—are:

$$\omega_p = \sqrt{\frac{1}{2}(\omega_c^2 - \omega_z^2) + \frac{1}{2}\sqrt{(\omega_c^2 \omega_1^2 + \varepsilon^2 \omega_z^4)}} ; \quad (7)$$

$$\omega_m = \sqrt{\frac{1}{2}(\omega_c^2 - \omega_z^2) - \frac{1}{2}\sqrt{(\omega_c^2 \omega_1^2 + \varepsilon^2 \omega_z^4)}} ;$$

$$\omega_z = \sqrt{2C_{002}\frac{q}{m}} ;\ \omega_c = \frac{q}{m}B;\ \omega_1 = \sqrt{\omega_c^2 - 2\omega_z^2}$$

When $\in = 0$ the usual expressions for the frequencies of a standard "circular" (non elliptical) Penning trap are recovered. For the example of FIG. 3, the ellipticity is $\in = 0.41$. According to equation 7, the frequencies of a trapped electron are: $\omega_p = 2\pi \cdot 14$ GHz, $\omega_z = 2\pi \cdot 28$ MHz and $\omega_m = 2\pi \cdot 26$ kHz. A magnetic field of B=0.5 T is assumed, motivated by the suitability of the corresponding cyclotron frequency for circuit-QED applications.

The radial motion in an ideal elliptical trap is:

$$(x(t), y(t) - y_0) = (A_p \xi_p \cos(\omega_p t) + A_m \xi_m \cos(\omega_m t), A_p \eta_p \sin(\omega_p t) + A_m \eta_m \sin(\omega_m t)). \quad (8)$$

The amplitudes are given by:

$$A_p = \frac{1}{\omega_p}\sqrt{\frac{2E_p}{\gamma_p m}},\ \gamma_p = 1 - \frac{\omega_z^2}{2\omega_p^2} \approx 1;$$

$$A_m = \sqrt{\frac{2E_m}{(\omega_m^2 - \omega_z^2/2)m}}.$$

The coefficients $\iota_{p,m}$ and $\eta_{p,m}$ have been calculated in general for an ideal elliptical Penning trap (M Kretzschmar 2008):

$$\xi_{p,m} = \sqrt{\frac{\omega_c^2 + \epsilon\omega_z^2 \pm \sqrt{\omega_c^2 \omega_1^2 + \varepsilon^2 \omega_z^4}}{2\omega_p/\omega_1 \sqrt{\omega_c^2 \omega_1^2 + \varepsilon^2 \omega_z^4}}} ; \quad (9)$$

$$\eta_{p,m} = \sqrt{\frac{\omega_c^2 - \epsilon\omega_z^2 \pm \sqrt{\omega_c^2 \omega_1^2 + \varepsilon^2 \omega_z^4}}{2\omega_p/\omega_1 \sqrt{\omega_c^2 \omega_1^2 + \varepsilon^2 \omega_z^4}}}$$

The symbols $E_p$ and $E_m$ represent the cyclotron and magnetron energies, respectively. As shown by Kretzschmar, the orbit of the reduced cyclotron motion is only slightly affected by the ellipticity: $\xi_p \approx \eta_p \approx 1$. It very nearly follows the circular shape of conventional Penning traps. On the contrary, the magnetron motion becomes an ellipse, where the orientation of the major and minor axes (along x or y) depends on the sign of $\in$. Moreover, that motion is stable for $-1 < \in < 1$ and, at the limit $|\in| \to 1$, it becomes very slow, $\omega_m \to 0$. In that case, the magnetron ellipse tends towards a line, with an increasingly wide major axes and a vanishing minor one (if $\in \to +1 \Rightarrow \xi_m \to \infty$, $\eta_m \to 0$ and vice versa for $\in \to -1 \Rightarrow \xi_m \to 0$, $\eta_m \to \infty$). For values $|\in| \geq 1$ the magnetron becomes an unbounded hyperbolic motion and trapping is not possible.

The ideal trap defined by the pure quadrupole potential of equation 6 is only valid for vanishing amplitudes of the trapped particle's motion. In real experiments the electric anharmonicities odd and even (equation 3) must be taken into account. These generate energy-dependent fluctuations/deviations of the frequencies $\omega_p$, $\omega_z$, $\omega_m$ All anharmonicities, even and odd, up to the $4^{th}$ order in the expansion of $\phi$, $3 \leq i+j+k \leq 4$, (see equation 3), produce frequency shifts which scale linearly with the energies of the particle. Hence, they can be expressed in matrix form:

$$\begin{pmatrix} \Delta\nu_p \\ \Delta\nu_z \\ \Delta\nu_m \end{pmatrix} = \begin{pmatrix} M_{1,1} & M_{1,2} & M_{1,3} \\ M_{2,1} & M_{2,2} & M_{2,3} \\ M_{3,1} & M_{3,2} & M_{3,3} \end{pmatrix} \cdot \begin{pmatrix} \Delta E_p \\ \Delta E_z \\ \Delta E_m \end{pmatrix}; \quad (10)$$

$$M = \begin{pmatrix} M_{1,1} & M_{1,2} & M_{1,3} \\ M_{2,1} & M_{2,2} & M_{2,3} \\ M_{3,1} & M_{3,2} & M_{3,3} \end{pmatrix} \text{ shifts matrix}$$

Each perturbation to $\phi_{quad}$ appearing in equation 3 delivers such a frequency-shifts matrix. In total the CPW-Penning trap requires nine $M^{ijk}$ matrices, corresponding to each $C_{ijk}$ perturbative Hamiltonian. The expressions for all $M^{ijk}$ are given in Appendix B. The overall frequency-shifts matrix is the sum of all of them:

$$M = M^{012} + M^{210} + M^{030} + M^{220} + M^{202} + M^{022} + M^{004} + M^{400} + M^{040} \quad (11)$$

For a single electron captured in the example trap with dimensions as given in page 10, with the voltages of FIG. 3 and with magnetic field B=0.5 T, the overall frequency-shifts matrix is:

$$M = \begin{pmatrix} 5 \cdot 10^{-6} & 0.5 & -0.9 \\ 1 \cdot 10^{-3} & 203 & -411 \\ -2 \cdot 10^{-3} & -0.4 & 2 \end{pmatrix} \text{Hz/K}. \quad (12)$$

The accurate measurement of the axial frequency is essential; in most cases the determination of the other particle's motional frequencies (or the spin state) depend upon it. Thus, the element $$M_{2,2} = \frac{\Delta v_z}{\Delta E_z}$$

is the most relevant and dangerous of all frequency shifts in M. In the example it amounts to 203 Hz/K. Such a dependence of $v_z$ on the axial energy—which is not constant but fluctuating with the temperature—would render the detection of the electron, or in general trapped charged particle, almost impossible, even at cryogenic temperatures.

$M_{2,2}$ is given by the sum of $M_{2,2}^{004}$ and $M_{2,2}^{012}$. Taking into account that $v_m \ll v_z \ll v_P$, we have:

$$M_{2,2}^{004} = \frac{q}{16\pi^4 m^2} \frac{3}{v_v^3} C_{004}; \; M_{2,2}^{012} = \frac{q^2}{32\pi^6 m^3} \frac{\eta_m^2}{v_z^5} C_{012}^2 \quad (13)$$

$M_{2,2}^{012}$ is always positive, since it is proportional to the square of $C_{012}$, while $M_{2,2}^{004}$ can be positive or negative, depending on the sign of $C_{004}$. Hence, if an appropriate optimal tuning ratio can be found, such that the latter matrix element cancels the former $T_c^{opt} \leftrightarrow M_{2,2}^{012} + M_{2,2}^{004} = 0$, then the linear dependence of $v_z$ upon the axial energy can be eliminated.

Figure 5:
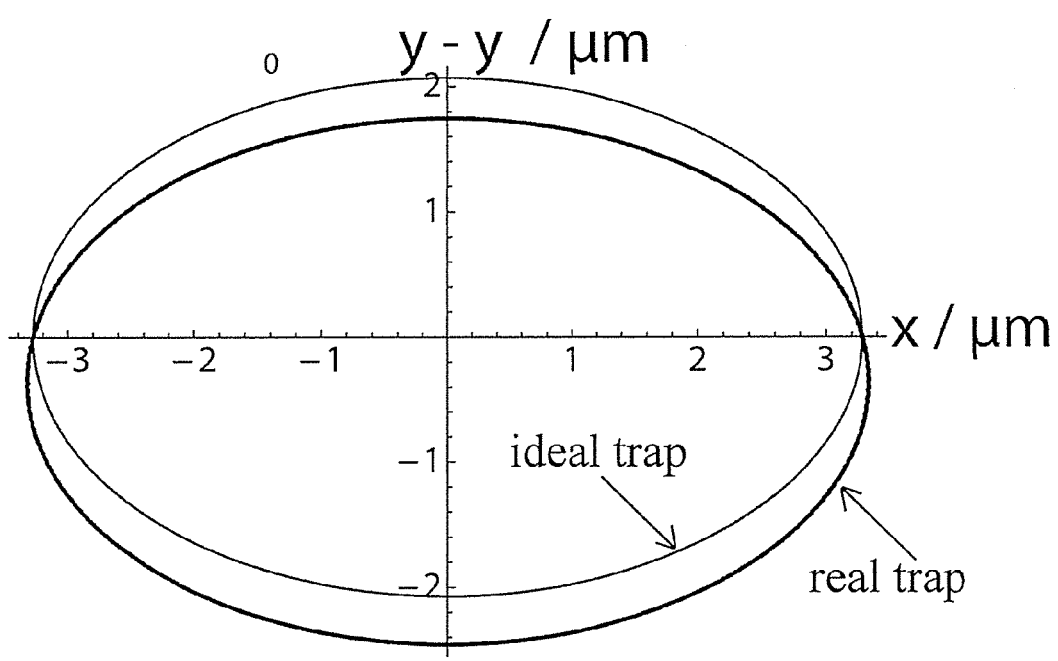
FIG. 5 is a graphical illustration of an optimal tuning ratio for the ion trap.

The existence of $T_c^{opt}$ cannot be universally guaranteed, however it turns out that this is often the case. For the example trap, it can be seen in FIG. 5, where $$\frac{\Delta v_z}{\Delta E_z}$$

is plotted as a function of the applied tuning ratio. One value, $T_c^{opt} = 1.13440$, eliminates $M_{2,2}$.

Since $v_z \propto \sqrt{C_{002}}$, both frequency shifts in equation 13 equally scale with the square root of the applied voltage to the ring electrode (the central electrode in the row 5) $V_r^{-1/2}$. The equation $M_{2,2}(T_c^{opt}) = 0$ is independent of the actual value of the potential applied to the central electrode in row 5 and is solely defined by the voltage ratios $T_c$ and $T_e$. A similar argument applies to the mass m and charge q. Thus, $T_c^{opt}$ is a well-defined quantity, independent of $V_r$ and of the trapped atomic species. It does change with, $T_e$ but this is simply equivalent to an inevitable dependence upon the trapping position $y_0$ (see FIGS. 7 and 8). The appearance of $\eta_m$ in $M_{2,2}^{012}$ also implies that $T_c^{opt}$ theoretically varies with the magnetic field, however, that dependence is negligible: $-2 \cdot 10^{-6} \text{T}^{-1}$ for the example.

$M_{2,2}^{012}$ is caused by the slight dependence of the trapping height on the axial energy, $y_0 = y_0(E_z)$. Indeed: for vanishing energy $E_z = 0$, $y_0$ is the solution to the implicit equation $C_{001}(y_0) = 0$. For $E_z > 0$ that equation must be modified into $C_{001}(y_0') + \langle z^2 \rangle C_{012}(y_0') = 0$. Here, $\langle z^2 \rangle$ represents the time average of $A_z^2 \cos(\omega_z t)^2$. Thus, the real height, $y_0' = y_0 + \Delta y$, depends on the axial amplitude, hence, on $E_z$. $\Delta y$ can be estimated as follows (we assume the approximation $C_{012}(y_0') \cong C_{012}(y_0)$):

$$C_{001}(y_0') + \langle z^2 \rangle C_{012}(y_0') - C_{001}(y_0) = \quad (14)$$

$$0 \to \frac{C_{001}(y_0 + \Delta_y) - C_{001}(y_0)}{\Delta_y} \Delta y + \langle z^2 \rangle C_{012}(y_0) = 0 \Rightarrow \Delta y =$$

$$-\frac{1}{2} \frac{C_{012}}{C_{020}} \langle z^2 \rangle = \left( A_z^2 \langle \cos(\omega_z t)^2 \rangle = \frac{E_z}{m\omega_z^2} \right) = -\frac{1}{8\pi^2 m v_z^2} \frac{C_{012}}{C_{020}}$$

At $y_0 + \Delta y$, the axial potential is modified with respect to $y_0$. In particular, the $E_z = 0$ axial curvature, $C_{002}(y_0)$, changes to $C_{002}(y_0')$. This subsequently forces the variation of $\omega_z$ as a function of $E_z$:

$$\Delta \omega_z = \frac{\partial \omega_z}{\partial y} \cdot \Delta y = \quad (15)$$

$$\frac{q}{m} \frac{1}{\sqrt{\frac{2qC_{002}}{m}}} \frac{\partial C_{002}}{\partial y} \Delta y \Rightarrow \frac{\Delta v_z}{\Delta E_z} = -\frac{q^2}{32\pi^6 m^3} \frac{C_{012}^2}{v_z^5} \left( \frac{C_{002}}{2_{020}} \right)$$

Figure 6:
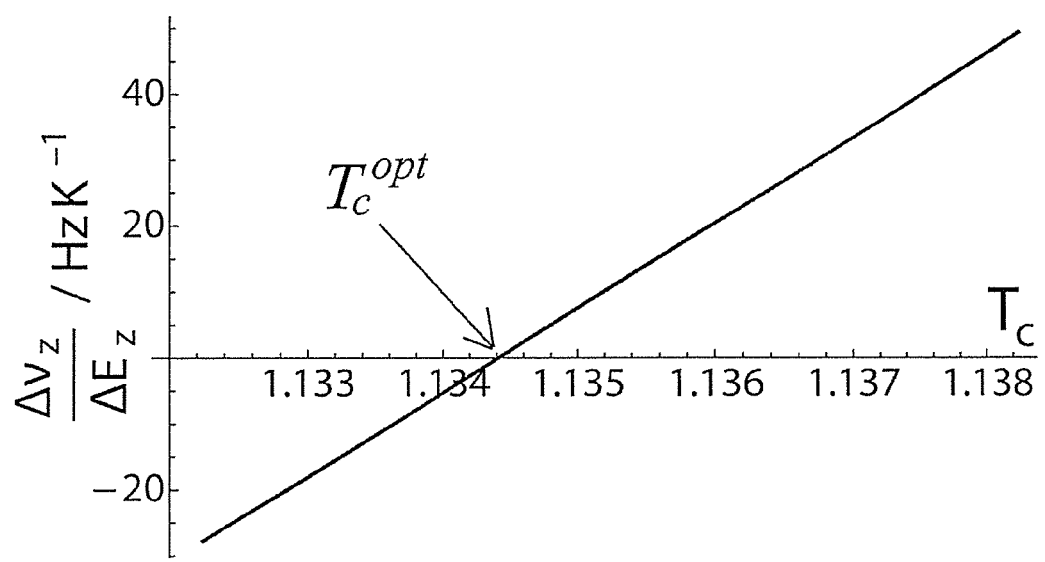
FIG. 6 is a graphical illustration of a magnetron ellipse of the ion trap.

The model described can be tested by computing numerically the radial motion of an electron in a real CPW-Penning trap, using the potential of equation 1 without approximations. The numerical calculation shows a vertical shift of the radial ellipse relative to the ideal one. An example, based upon the trap of section, is plotted in FIG. 6. This has been computed assuming axial energy $E_z = 4$. K, magnetron energy $$E_m = -\frac{v_m}{v_z} E_z$$

and vanishing cyclotron energy. The shift predicted by equation 14 amounts to $\Delta y = -0.355$ μm and is in good agreement with the numerical result of $\Delta y = -0.325$ μm.

Figure 7:
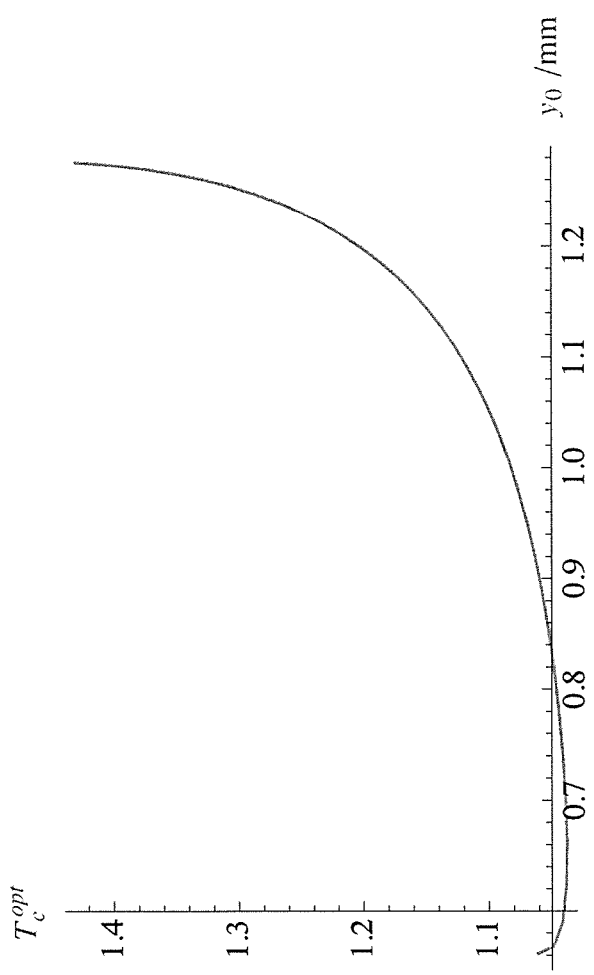
FIG. 7 is a graphical illustration of an optimal tuning ratio of the ion trap as a function of the height $y_0$. The height $y_0$ is the equilibrium position of the trapped ions, above the central electrode in the row.

An optimal tuning ratio can be found within a continuous interval of trapping heights, however it varies smoothly as a function of $y_0$. This is shown in FIG. 7, where the plot of the optimal tuning ratio, $T_c^{opt}$, versus $y_0$ is presented. A useful interval exists ($0.6 \text{ mm} \leq y_0 \leq 1.3 \text{ mm}$, for the example), where $M_{2,2}$ can be eliminated. Beyond the upper or lower bounds of that interval, the optimal tuning ratio does not exist.

Figure 8:
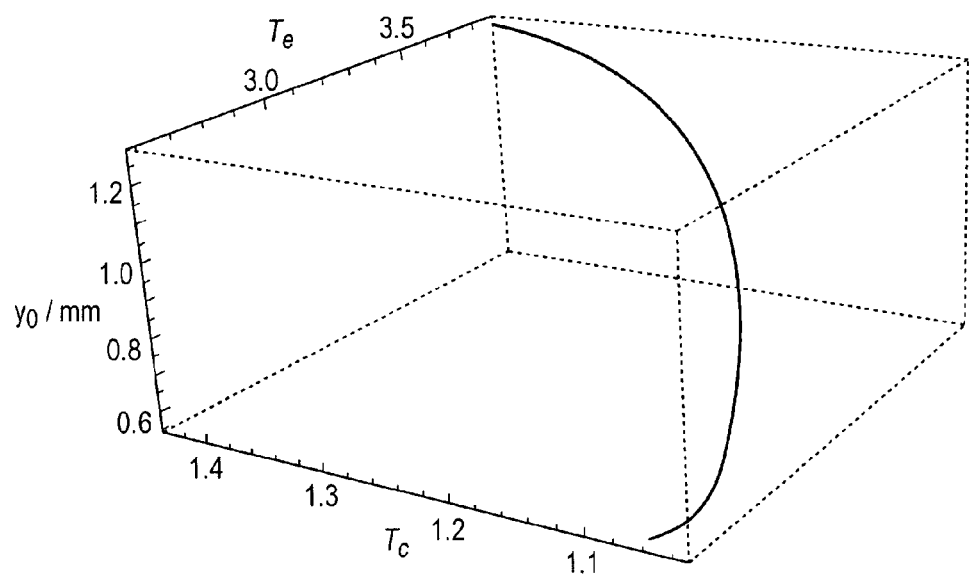
FIG. 8 is a graphical illustration of variation of the height $y_0$ as a function of the applied voltage ratios $T_c$, $T_e$. This graphic assumes a row with 5 electrodes.

As shown in FIG. 8, $T_c$ and $T_e$ can be tuned independently and multiple combinations can be found to obtain one particular trapping position. However, the compensated interval is determined by a univocal relationship, $y_0 \leftrightarrow (T_e, T_c^{opt})$, as featured in FIG. 8. It must be noted also that $T_e$ is the main parameter for changing $y_0$, while $T_c$ is basically used for compensation.

After eliminating the linear dependence of the axial frequency upon $E_z$, non-linear shifts may still be important, particularly when $y_0$ is small. The next most significant even anharmonicities, whose effect can be calculated by first order perturbation theory, are $C_{006}$ and $C_{008}$. These produce the following quadratic and cubic shifts, respectively:

$$\Delta v_z = \frac{15q}{128\pi^6 m^3} \frac{C_{006}}{v_z^5}(\Delta E_z)^2; \Delta v_z = \frac{140q}{2048\pi^8 m^4} \frac{C_{008}}{v_z^7}(\Delta E_z)^3. \quad (16)$$

Figure 10:
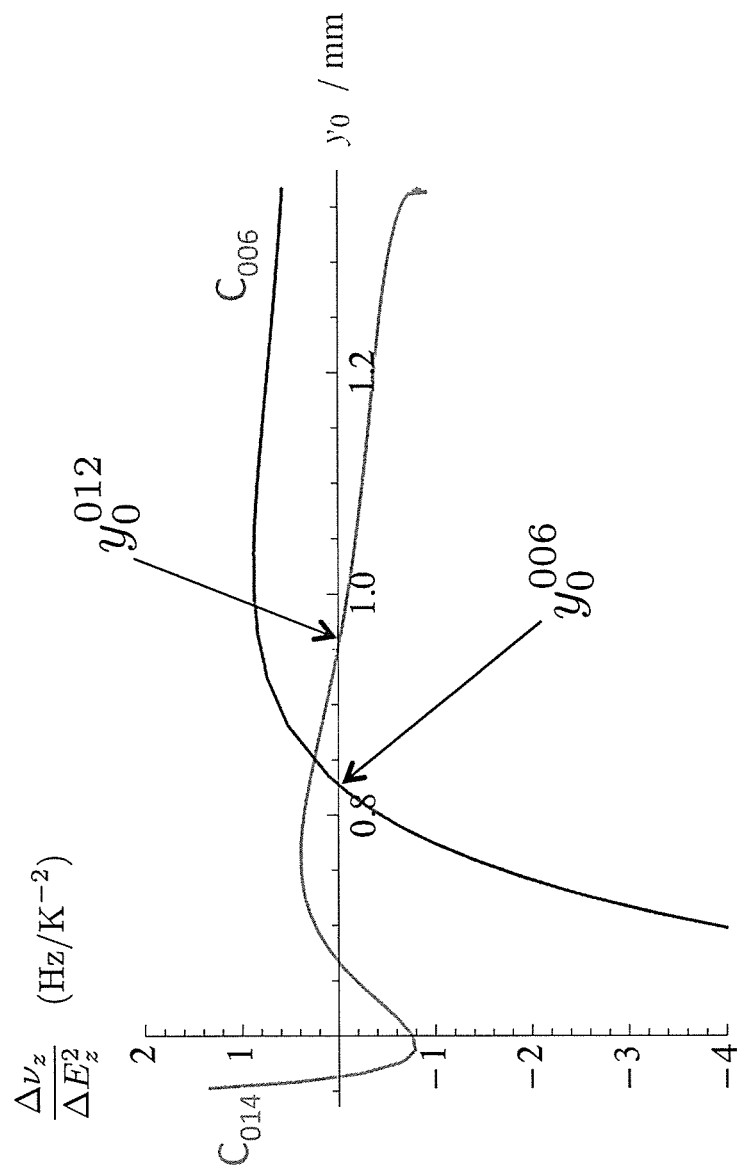
FIG. 10 is a graphical illustration of quadratic axial frequency shifts produced by the anharmonicities $C_{006}$, $C_{014}$.
Figure 11:
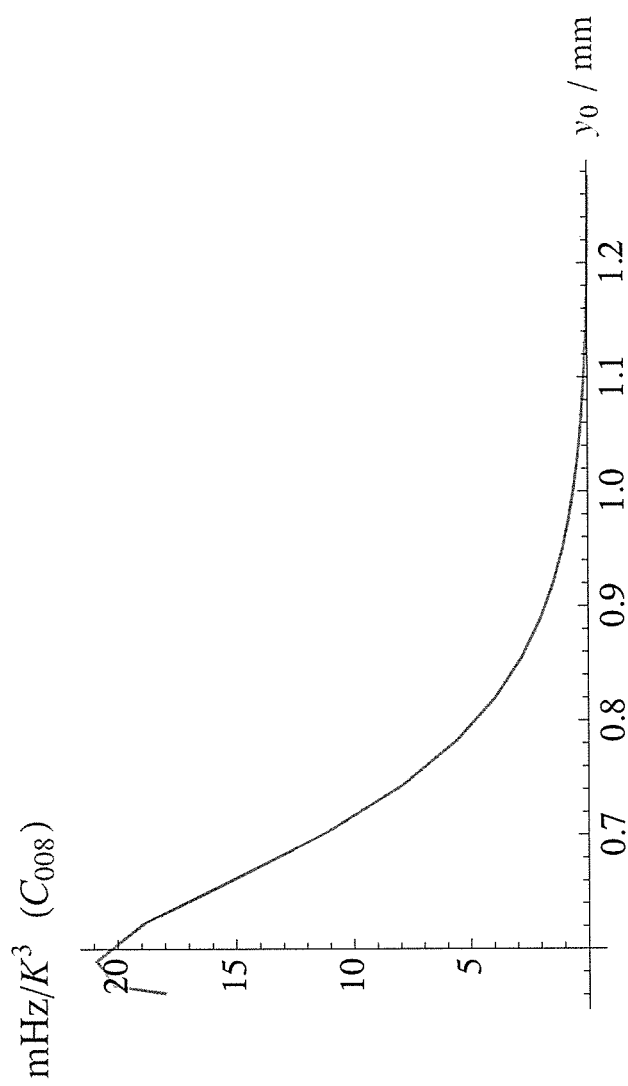
FIG. 11 is a graphical illustration of the cubic axial frequency shift produced by the anharmonicity $C_{008}$.

For the example trap, these non-linear shifts are shown in FIGS. 10 and 11. The next most significant odd anharmonicities, after those included in equation 3, are: $C_{014}$, $C_{212}$, $C_{032}$, $C_{410}$, $C_{230}$ and $C_{O50}$. The calculation of the corresponding frequency shifts, with rigorous second order perturbation theory, would be extremely cumbersome. Instead, we employ the model presented in equations 14 and 15. Following the derivation of those equations we obtain he following frequency shifts:

$$\Delta v_z = -\frac{3q}{128\pi^6 m^3 v_z^5} \cdot \frac{C_{012} \cdot C_{014}}{C_{020}} (\Delta E_z)^2 \quad (17)$$

$$\Delta v_z = -\frac{q}{128\pi^6 m^3 v_z^3} \cdot \frac{C_{012} \cdot C_{212}}{C_{020}} \Delta E_z \left( \frac{\xi^{2m}}{v_m^2 - v_z^2/2} \Delta E_m \right)$$

Figure 9:
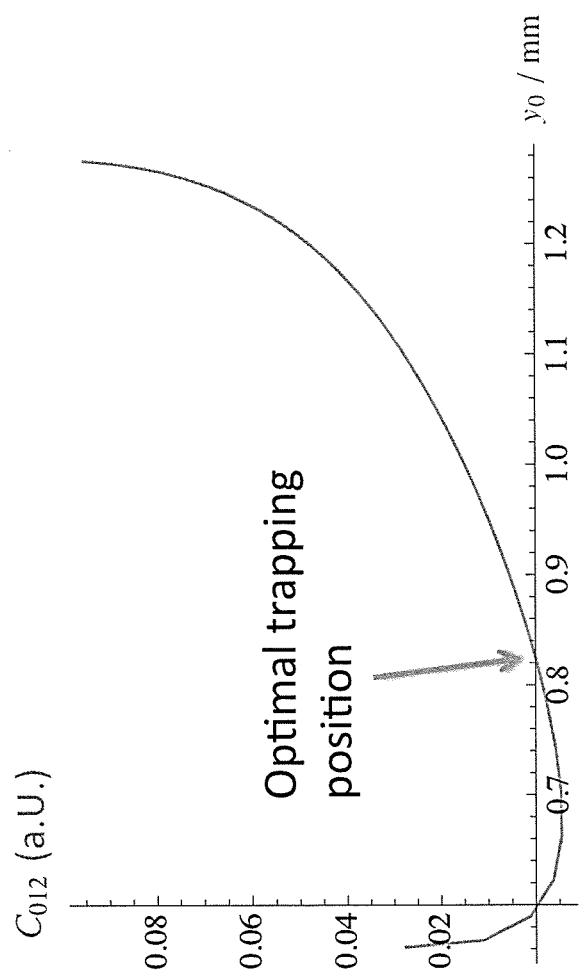
FIG. 9 is a graphical illustration of vertical anharmonicity $C_{012}$ along a compensated path of the ion trap.

The shift due to the term $C_{014}$ predicted by equation 17 has a similar magnitude as the one produced by $C_{006}$ in equation 16. It must be taken into account when designing a coplanar-waveguide Penning trap. Notice that equation 17 both frequency shifts, produced by $C_{014}$ and $C_{212}$ vanish at the position where the term $C_{012}$ vanishes. This position is denoted by $y_0^{012}$. For the trap of our example, the position $y_0^{012}$ is shown in FIG. 9.

Equation 17 predicts an axial frequency shift due to $C_{212}$ scaling with the products $\Delta E_z \cdot \Delta E_p$ and $\Delta E_z \cdot \Delta E_m$. In the former case, the shift is proportional to $1/v_p^2$; hence, it is normally negligible. In the latter case, the fluctuations of the magnetron energy, $\Delta E_m$, are very small and the corresponding value of $\Delta v_z$ is also negligible. Thus, $C_{212}$ can be ignored. The same arguments apply to $C_{O32}$, which produces a shift very similar to tat of equation 17 for $C_{212}$ ($\xi_{p,m}$ must be simply substituted by $\eta_{p,m}$). The remaining $5^{th}$ order coefficients, $C_{410}$, $C_{230}$, $C_{O50}$, generate only deviations of the cyclotron and magnetron frequencies $v_p$ and $v_m$ with products of $\Delta v_p$ and $\Delta v_m$. Therefore they can be ignored too, since those fluctuations are very small, as can be seen from the linear frequency shifts matrix (see example of equation 12). Finally, similar arguments apply to all $6^{th}$ order coefficients which have not been considered in equation 17 and the following discussion, namely $C_{222}$, $C_{204}$, $C_{024}$, $C_{420}$, $C_{402}$, $C_{042}$, $C_{240}$, $C_{600}$, $C_{060}$; they are all irrelevant.

Figure 12:
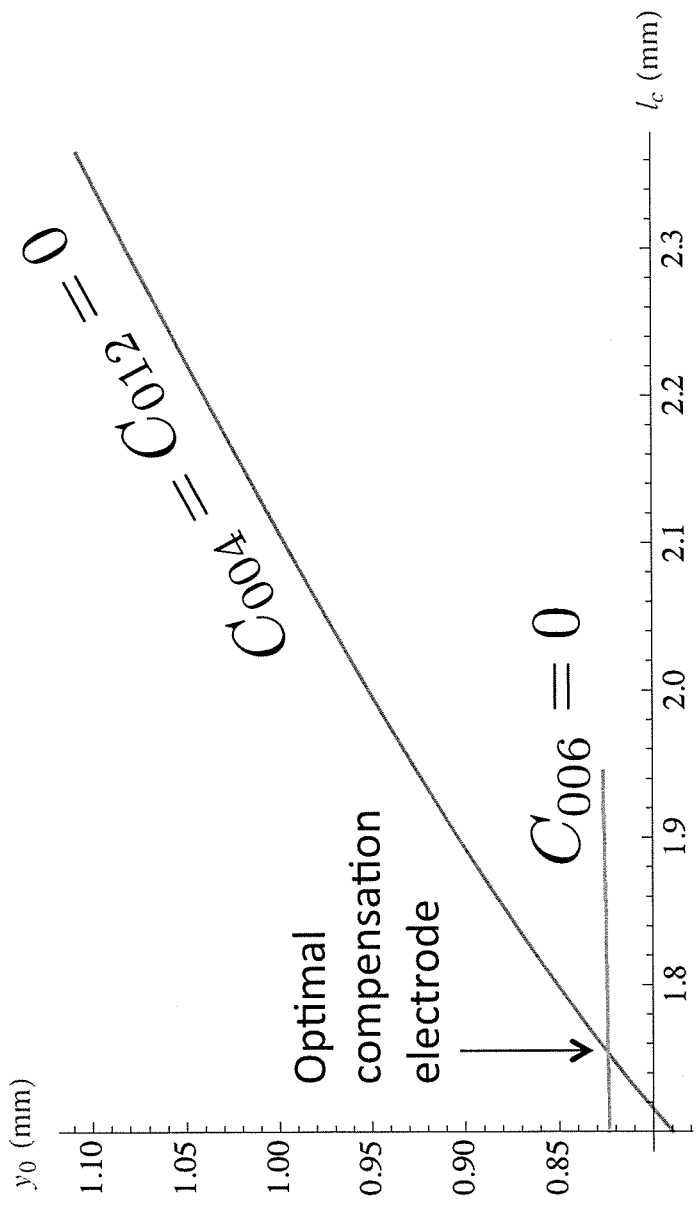
FIG. 12 is a graphical illustration of the optimal trapping positions $y_0^{012}$ and $y_0^{016}$ as a function of a length $l_c$ of compensation electrodes of the ion trap.
Figure 13:
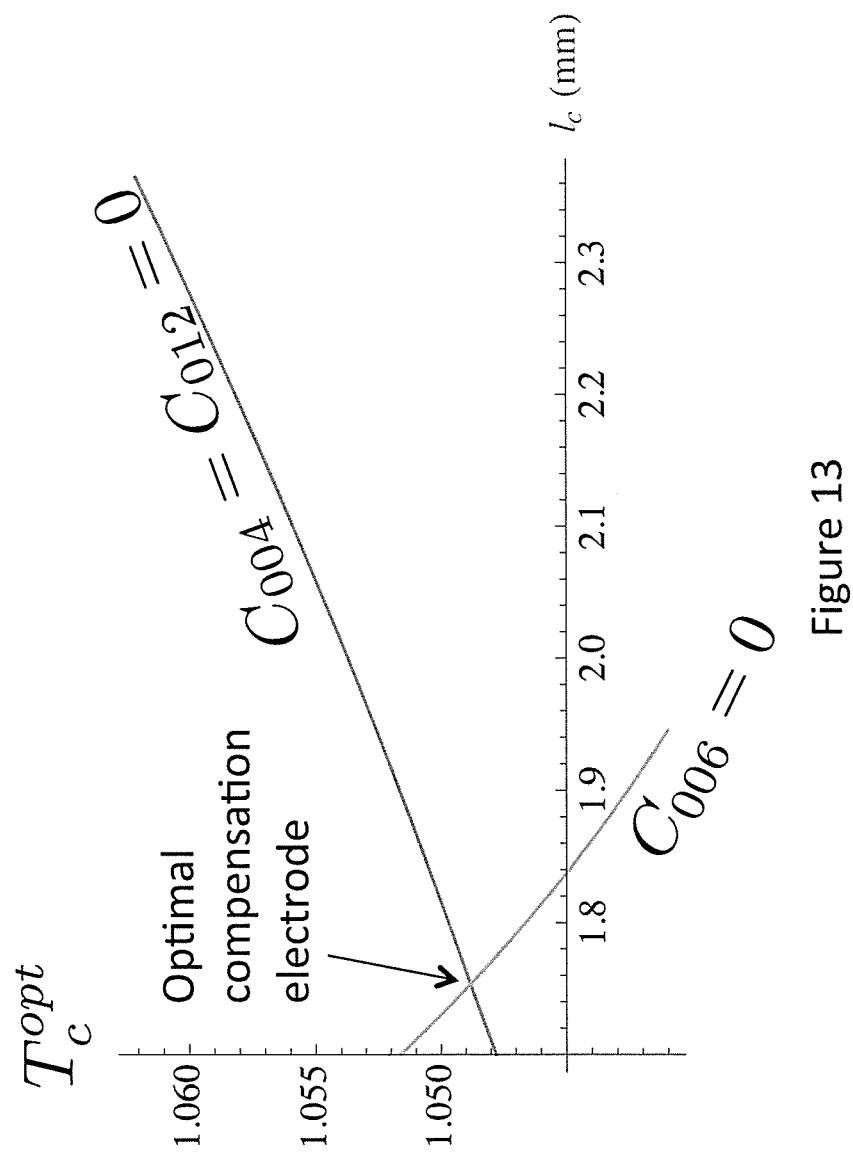
FIG. 13 is a graphical illustration of an optimal tuning ratio of the ion trap as a function of the length $l_c$ of compensation electrodes.

FIG. 10 reveals the existence of one particular position, $y_0^{006} \sim 0.83$ mm, at which the coefficient $C_{006}$ vanishes. The question which arises is whether the trap can be designed to make $y_0^{006}$ and $y_0^{012}$ coincident, thereby optimizing the compensation electrode. The answer is affirmative and is illustrated in FIG. 12. It shows the variation of $y_0^{012}$ and $y_0^{006}$ when changing the length of the compensation electrode, $l_c$, while keeping all other dimensions of the trap constant. For the example, when $l_c \approx 1.84$ mm $\Rightarrow y_0^{012} = y_0^{006}$. This result is also visible in FIG. 13, where the intersection of the two curves shows the optimised length of the correction electrode. For this optimized trap, $C_{004} = C_{012} = C_{006} = 0$ at $y_0^{012}$.

Figure 14:
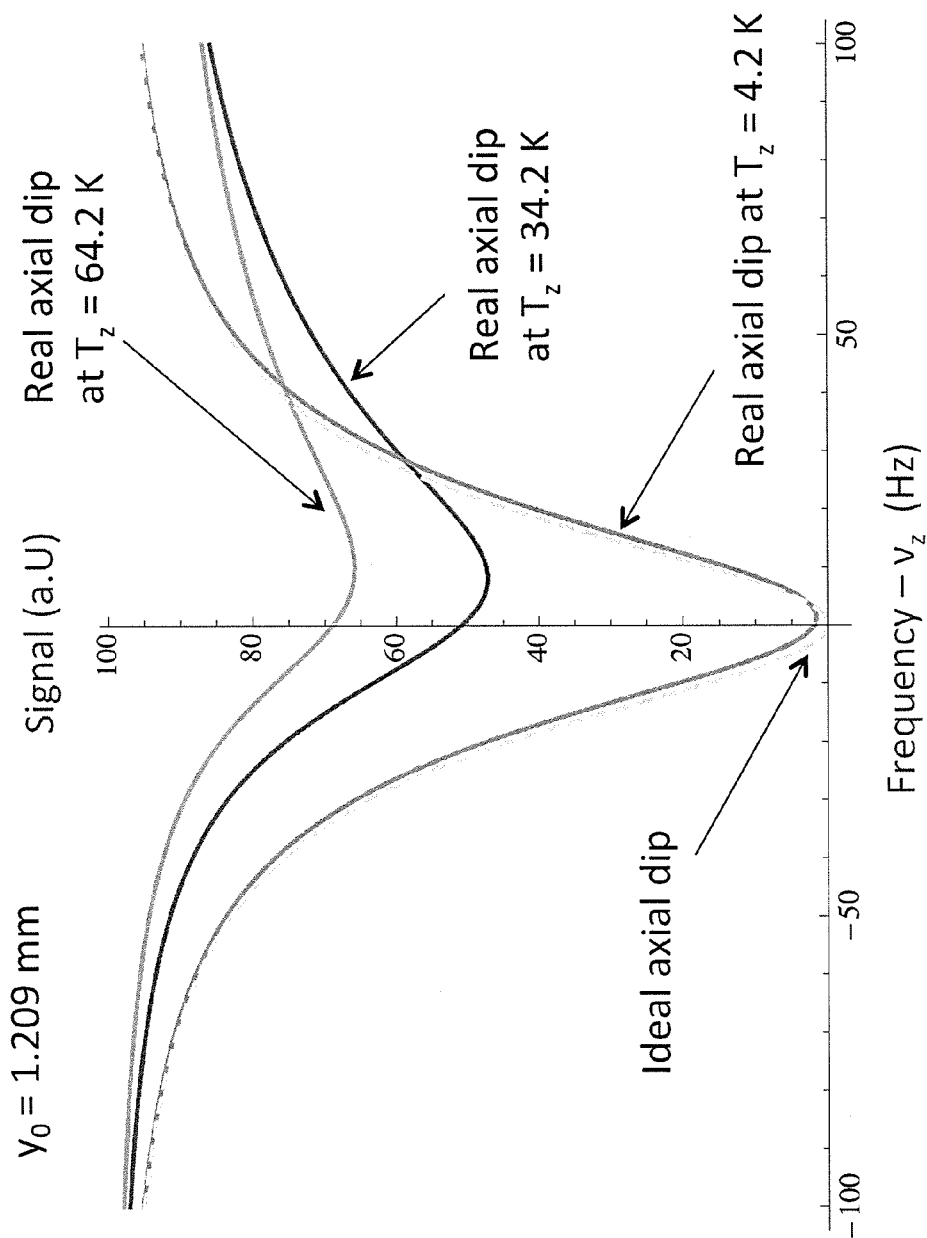
FIG. 14 is a graphical illustration of axial dip of a single electron trapped in the ion trap.
Figure 15:
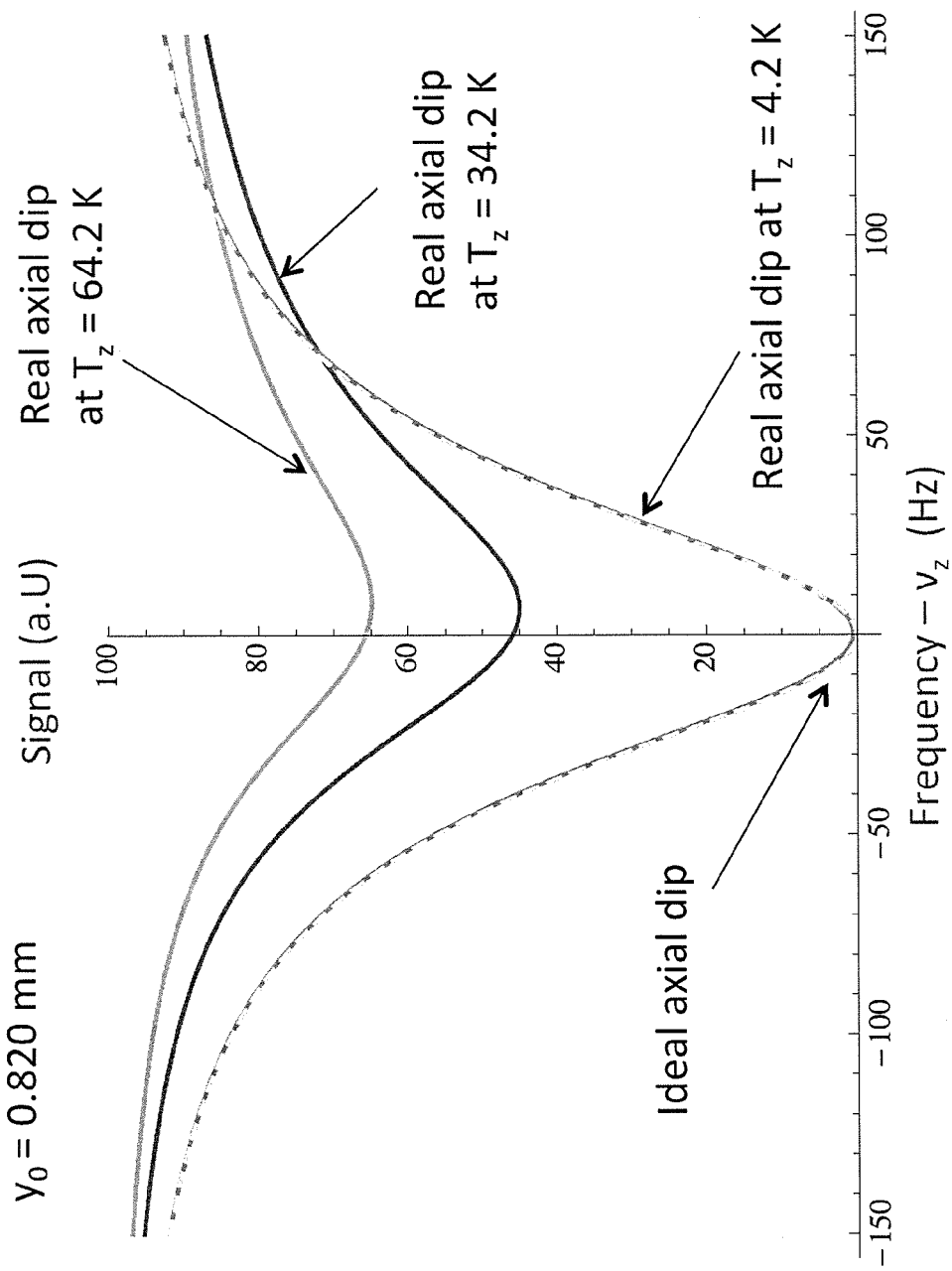
FIG. 15 is another graphical illustration of axial dip of a single electron trapped in the ion trap.

With the dependence $v_z = v_z(E_z, E_z^2, E_z^3)$ given in equations 13, 16 and 17, it is possible to perform a realistic simulation of the axial signal of a trapped electron. Assuming the detection scheme employed in many Penning trap experiments, the signal appears as a shortcut (=the axial dip) of the resonance resistance of an external detection parallel LC-circuit. The goal is to compare the actual detection signal of a trapped electron in the real trap, to the detection signal of the ideal trap; the purpose is estimating the "relative visibility" of the former. The technical details are therefore unimportant, although they can be found in the standard literature, in articles of Gabrielse, Dehmelt and other authors. The simulations are shown in FIGS. 14 and 15. The curves are obtained by averaging the axial dip (with $v_z = v_z(E_z, E_z^2, E_z^3)$) over a Boltzmann distribution of the axial energy. Three different values of the axial temperature $T_z$ have been analysed.

FIG. 14 shows the reduction of the "visibility" of the dips with increasing axial temperature. A random position, $y_0 = 1.209$ mm (but with optimized tuning ratio), has been chosen for the plot. In this case, $C_{006}$ and $C_{014}$ produce the increasing deterioration of the dip, while $C_{008}$ is negligible (see FIGS. 10 and 11). In FIG. 15 $y_0 = y_0^{012} = y_0^{006} = 0.820$ mm. Now, $C_{004} = C_{012} = C_{006} = 0$, however, $C_{008}$ still diminishes the quality of the signal with increasing axial temperature. It can be concluded, that the detection of a single electron at 4.2 K (or lower) should be always possible within the compensated interval of the trap. However, for increasing temperatures, the non-linear anharmonicities make its observation significantly more difficult, even for relatively modest values of $T_z$.

Figure 16:
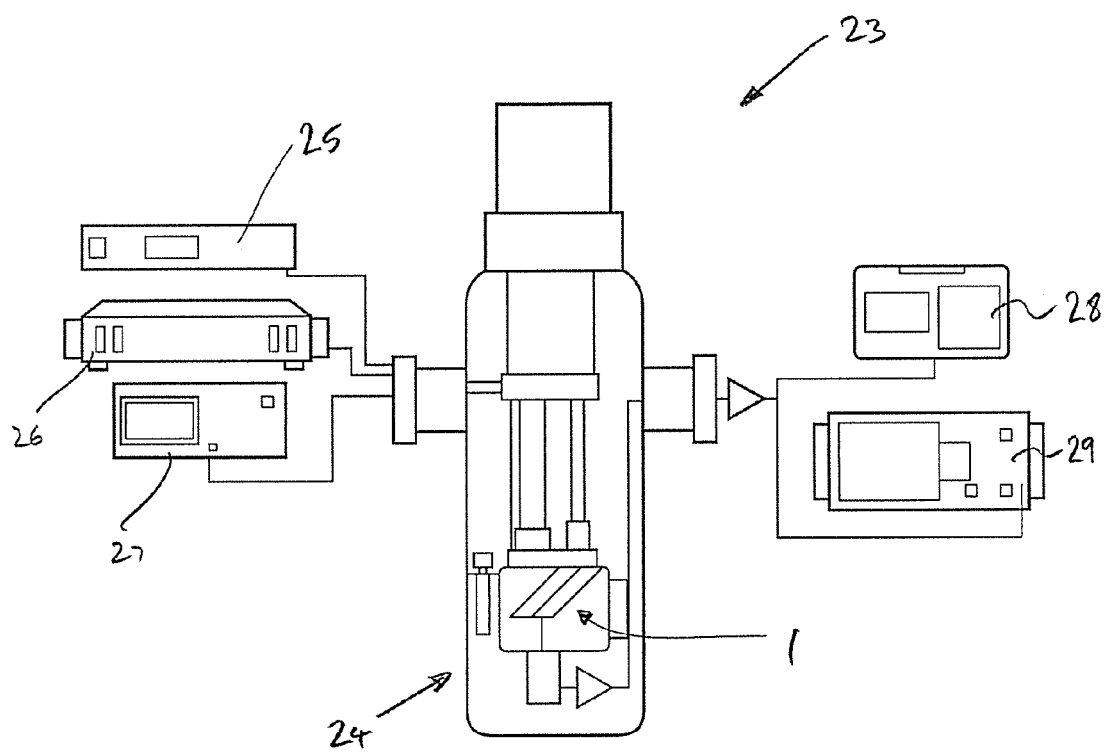
FIG. 16 is a schematic illustration of a cryogenic mass spectrometer incorporating the ion trap.

Referring to FIG. 16, a mass spectrometer 23 according to an embodiment of the disclosure comprises the ion trap 1 located in a cryogenic vacuum chamber 24 capable of cooling the ion trap to a temperature of 4.2 K or lower. A DC voltage source 25 is provided to supply the voltages $V_r$, $V_c$, $V_e$ to the ring electrode 6, compensation electrodes 7, 8 and end cap electrodes 9, 10. A microwave generator 26 and function generator 27 are provided for injecting microwaves into the ion trap for probing the trapped particles, and an oscilloscope 28 and Fourier transform analyser are provided for analysing microwaves exiting the ion trap 1. Multiple ion traps 1 can be provided in the cryogenic vacuum chamber 24, allowing the mass spectrometer 23 to analyse multiple trapped particles at the same time, under similar ambient conditions.

Figure 17:
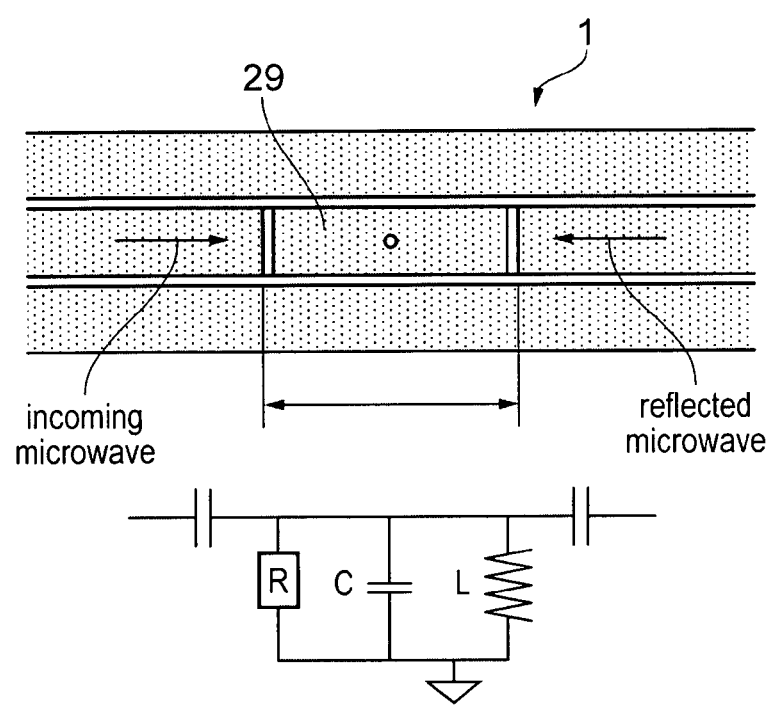
FIG. 17 is a schematic illustration of a waveguide incorporating the ion trap.
Figure 18:
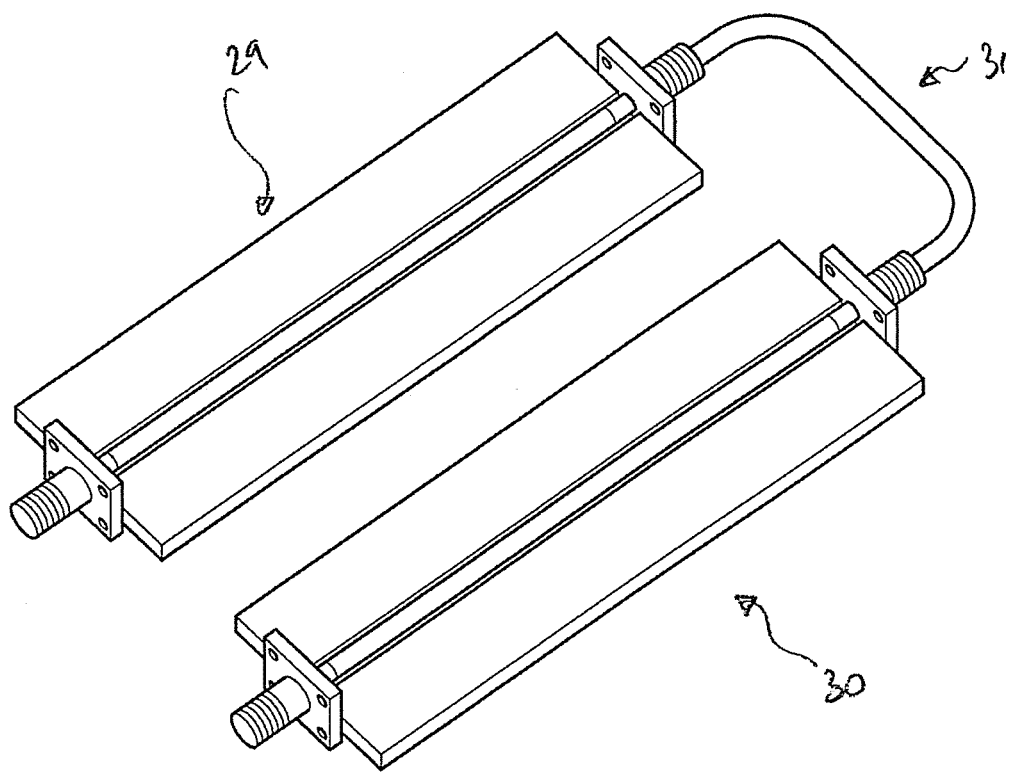
FIG. 18 is a schematic illustration of the ion trap coupled to another microwave circuit.

Referring to FIGS. 17 and 18, the ion trap 1 can provide a cavity 29 for microwaves. The cavity is equivalent to an LC circuit, as shown in FIG. 17, and can be coupled to a distant microwave cavity 30 via an external microwave transmission line to form a microwave quantum circuit.

Turning to the magnetic source on a chip, the Hamiltonian of a particle with charge q and mass m in the coplanar-waveguide Penning trap is given by:

$$H = \frac{(\vec{p} - \vec{A})^2}{2m} + q \cdot \phi(x, y, z) \quad (18)$$

In equation 18 $\vec{p}$ is the canonical momentum of the trapped particle and $\vec{A}$ is the magnetic vector potential. The electrostatic potential $\phi(x, y, z)$ is given by equation 1, q, m are the charge and mass of the trapped particle, respectively. The magnetic field is calculated as $\vec{B} = \nabla \times \vec{A}$. The perfectly homogeneous magnetic field is $\vec{B} = B_0 \hat{u}_z$. The magnetic vector potential of the perfectly homogeneous magnetic field is given by $\hat{A}_0 = B_0/2(x\hat{u}_y - y\hat{u}_x)$. The ideal Hamiltonian is given by $$H_0 = \frac{(\vec{p} - \vec{A}_0)^2}{2m} + q\phi(x, y, z).$$

The total Hamiltonian is therefore the sum of the ideal Hamiltonian plus a perturbative Hamiltonian: $H = H_0 + \Delta H$. The perturbative Hamiltonian is given by the following expression:

$$\Delta H = -\frac{q}{m}\vec{p}\cdot\Delta\vec{A} + \frac{q^2}{m}\vec{A}_0\cdot\Delta\vec{A} + \frac{q^2}{2m}\Delta\vec{A}\cdot\Delta\vec{A} \quad (19)$$

The effect of the quadratic term $$\frac{q^2}{2m}\Delta\vec{A}\cdot\Delta\vec{A}$$

can be neglected, since, for smaller deviations from the homogeneous case, it is much smaller than the other terms in equation 19 (see for instance Int. J. Mass Spec. Ion Proc. 141, 101, 1995). With this approximation, it is possible to analyse in detail the magnetic source as described in FIGS. 1 and 2. The magnetic elements 14,15,16,17 and 18, all must be aligned along the x-axes, as defined in FIG. 1. The length of all these elements is considerably longer than the width of the electrodes in the array x. The width of the electrodes is defined by the symbol $S_0$, hence the length of the magnetic elements is at least a factor 5 times $S_0$ or even longer. With this constraint on the length of the electrodes, the magnetic vector potential seen at the position of the trapped particles, i.e. at the height $y_0$ above the central electrode in the row, can be assumed to have the following general form:

$$\vec{A}(x) = -\frac{\mu_0}{4\pi}\int dV' \frac{J(x')}{|x - x'|} \quad (20)$$

In equation 20 the symbol $\mu_0$ represents the magnetic permeability. The current density running along the wires is oriented along the x-axes. Assuming it is homogeneous along the whole length of the magnetic elements/wires $J(x') = J_0\hat{u}_x$, the magnetic vector potential is therefore:

$$\vec{A}(x) = -\frac{\mu_0 J_0}{4\pi}\hat{u}_x\int dV' \frac{1}{|x - x'|} = A(x, y, z)\hat{u}_x \quad (21)$$

With the restriction of the magnetic elements being very long as compared to the width of the electrodes width $S_0$ the magnetic vector potential becomes a vector with component only in the $\hat{u}_x$ direction. Now, choosing the coulomb Gauge, this gives $\nabla\cdot\vec{A}(x) = 0$, hence $$\frac{\partial A}{\partial x} = 0 \Rightarrow A = A(y, z),$$

the magnetic vector potential is not a function of the x coordinate $A \ne A(x)$. The components of the magnetic field are therefore:

$$B_x = \frac{\partial A_y}{\partial z} - \frac{\partial A_z}{\partial y} = 0; \quad (22)$$

$$B_y = \frac{\partial A_x}{\partial z} - \frac{\partial A_z}{\partial x} = \frac{\partial A}{\partial z};$$

$$B_z = \frac{\partial A_y}{\partial x} - \frac{\partial A_x}{\partial y} = -\frac{\partial A}{\partial y}$$

The series expansion of the magnetic vector potential function (equation 21) around the trapping position $(0, y_0, 0)$ is given by the following expression:

$$A(y_0) + \frac{\partial A}{\partial y}(y - y_0) + \frac{\partial A}{\partial z}z + \frac{1}{2!}\cdot\frac{\partial^2 A}{\partial y}(y - y_0)^2 + \frac{1}{2!}\cdot\frac{\partial^2 A}{\partial z^2}z^2 + \quad (23)$$

$$\frac{1}{1!\cdot 1!}\cdot\frac{\partial^2 A}{\partial y\partial z}(y - y_0)z + \frac{1}{2!\cdot 1!}\cdot\frac{\partial^3 A}{\partial y^2\partial z}(y - y_0)^2 z +$$

$$\frac{1}{1!\cdot 2!}\cdot\frac{\partial^3 A}{\partial y\partial z^2}(y - y_0)z^2 + \frac{1}{3!}\cdot\frac{\partial^3 A}{\partial y^3}(y - y_0)^3 + \frac{1}{4!}\cdot\frac{\partial^4 A}{\partial z^4}z^4 +$$

$$\frac{1}{4!}\cdot\frac{\partial^4 A}{\partial y^4}(y - y_0)^4 + \frac{1}{2!\cdot 2!}\cdot\frac{\partial^4 A}{\partial y^2\partial z^2}(y - y_0)^2 z^2 + \ldots$$

The symmetry of the magnetic array (see FIGS. 1 and 2) implies that $A(y,z) = A(y,-z)$, $\forall z$. Thus, all odd derivatives of $A(y,z)$ with z vanish at the trapping position $(0, y_0, 0)$. The series expansion of $A(y,z)$, simplifies to:

$$A(y, z) = A(y_0) + \frac{\partial A}{\partial y}(y - y_0) + \frac{1}{2!}\cdot\frac{\partial^2 A}{\partial y^2}(y - y_0)^2 + \frac{1}{2!}\cdot\frac{\partial^2 A}{\partial z^2}z^2 + \quad (24)$$

$$\frac{1}{1!2!}\cdot\frac{\partial^3 A}{\partial y\partial z^2}(y - y_0)z^2 + \frac{1}{3!}\cdot\frac{\partial^3 A}{\partial y^3}(y - y_0)^3 + \frac{1}{4!}\cdot\frac{\partial^4 A}{\partial z^4}z^4 +$$

$$\frac{1}{4!}\cdot\frac{\partial^4 A}{\partial y^4}(y - y_0)^4 + \frac{1}{2!2!}\cdot\frac{\partial^4 A}{\partial y^2\partial z^2}(y - y_0)^2 z^2 + \ldots$$

The constant $A(y_0)$ has no dynamic effect and can be ignored. Now, taking into account the expressions for the magnetic field components $B_y$, $B_z$ of equation (22), the series expansion of the magnetic vector potential can be written as follows:

$$A(y, z) = -B_z^0(y - y_0) - \frac{1}{2!}\cdot\frac{\partial B_z}{\partial y}(y - y_0)^2 + \frac{1}{2!}\cdot\frac{\partial B_y}{\partial z}z^2 - \quad (25)$$

$$\frac{1}{1!2!}\cdot\frac{\partial^2 B_z}{\partial z^2}(y - y_0)z^2 - \frac{1}{3!}\cdot\frac{\partial^2 B_z}{\partial y^2}(y - y_0)^3 + \frac{1}{4!}\cdot\frac{\partial^3 B_y}{\partial z^3}z^4 -$$

$$\frac{1}{4!}\cdot\frac{\partial^3 B_z}{\partial y^3}(y - y_0)^4 - \frac{1}{2!2!}\cdot\frac{\partial^3 B_z}{\partial y\partial z^2}(y - y_0)^2 z^2 + \ldots$$

Hence, this gives the following magnetic vector potential terms:

$$\vec{A}_0 = -B_z^0(y - y_0)\hat{u}_x \text{(ideal part)}$$

$$\vec{A}_1 = \left(-\frac{1}{2!}\cdot\frac{\partial B_z}{\partial y}(y - y_0)^2 + \frac{1}{2!}\cdot\frac{\partial B_y}{\partial z}z^2\right)\hat{u}_x$$

$$\vec{A}_2 = \left(-\frac{1}{1!2!}\cdot\frac{\partial^2 B_z}{\partial z^2}(y - y_0)z^2 - \frac{1}{3!}\cdot\frac{\partial^2 B_z}{\partial y^2}(y - y_0)^3\right)\hat{u}_x$$

$$\vec{A}_3 = \left( \frac{1}{4!} \cdot \frac{\partial^3 B_y}{\partial z^3} z^4 - \frac{1}{4!} \cdot \frac{\partial^3 B_z}{\partial y^3}(y-y_0)^4 - \frac{1}{2!2!} \cdot \frac{\partial^3 B_z}{\partial y \partial z^2}(y-y_0)^2 z^2 \right) \hat{u}_x$$

$$\vec{A}_4 = \left( -\frac{1}{5!} \cdot \frac{\partial^4 B_y}{\partial y^4}(y-y_0)^5 - \frac{1}{3!2!} \cdot \frac{\partial^4 B_z}{\partial y^2 \partial z^2}(y-y_0)^3 z^2 - \frac{1}{1!4!} \cdot \frac{\partial^4 B_z}{\partial z^4}(y-y_0)z^4 \right) \hat{u}_x$$

Employing Maxwell's equations, the following relationships among the derivatives of the magnetic field components are obtained:

$$\nabla \times \vec{B} = \vec{0} \Rightarrow \frac{\partial B_z}{\partial y} = \frac{\partial B_y}{\partial z}; \quad (26)$$

$$\nabla \cdot \vec{B} =$$
$$0 \Rightarrow \frac{\partial B_x}{\partial x} + \frac{\partial B_y}{\partial y} + \frac{\partial B_z}{\partial z} = 0 \Rightarrow \frac{\partial B_y}{\partial y} + \frac{\partial B_z}{\partial z} = 0 \Rightarrow \frac{\partial B_y}{\partial y} = -\frac{\partial B_z}{\partial z}$$

With these relationships among the derivatives the expressions for the magnetic vector potential terms can be simplified:

$$\frac{\partial B_z}{\partial y} = \frac{\partial B_y}{\partial z} \Rightarrow \vec{A}_1 = \frac{1}{2} \cdot \frac{\partial B_z}{\partial y}(z^2 - (y-y_0)^2)\hat{u}_x$$

$$\frac{\partial^2 B_z}{\partial y^2} = \frac{\partial}{\partial y}\frac{\partial B_z}{\partial y} = \frac{\partial}{\partial y}\frac{\partial B_y}{\partial z} = \frac{\partial}{\partial z}\frac{\partial B_y}{\partial y} =$$
$$-\frac{\partial}{\partial z}\frac{\partial B_z}{\partial z} = -\frac{\partial^2 B_z}{\partial z^2} \to \vec{A}_2 = \frac{1}{3!}\frac{\partial^2 B_z}{\partial y^2}(y-y_0)(3z^2-(y-y_0 2ux$$

$$\frac{\partial^3 B_z}{\partial y \partial z^2} = \frac{\partial}{\partial y}\frac{\partial^2 B_z}{\partial y^2} = \frac{\partial}{\partial y}\left(-\frac{\partial^2 B_z}{\partial y^2}\right) = -\frac{\partial^3 B_z}{\partial y^3};$$

$$\frac{\partial^3 B_y}{\partial z^3} = \frac{\partial^2}{\partial z^2}\frac{\partial B_y}{\partial z} = \frac{\partial^2}{\partial z^2}\frac{\partial B_z}{\partial y} = \frac{\partial^3 B_z}{\partial y \partial z^2} = -\frac{\partial^3 B_z}{\partial y^3} \to \vec{A}_3 =$$
$$\frac{1}{4!} \cdot \frac{\partial^3 B_z}{\partial y^3}(6(y-y_0)^2 z^2 - z^4 - (y-y_0)^4)\hat{u}_x$$

$$\frac{\partial^4 B_z}{\partial y^2 \partial z^2} = \frac{\partial^2}{\partial y^2}\frac{\partial^2 B_z}{\partial z^2} = -\frac{\partial^4 B_z}{\partial y^4};$$

$$\frac{\partial^4 B_z}{\partial z^4} =$$
$$\frac{\partial^2}{\partial z^2}\frac{\partial^2 B_z}{\partial z^2} = -\frac{\partial^2}{\partial z^2}\frac{\partial^2 B_z}{\partial y^2} = -\frac{\partial^4 B_z}{\partial y^2 \partial z^2} = \frac{\partial^4 B_z}{\partial y^4} \to$$

gives the expression $$\vec{A}_4 = \frac{1}{5!} \cdot \frac{\partial^4 B_z}{\partial y^4}(y-y_0)(10(y-y_0)^2 z^2 - 5z^4 - (y-y_0)^4)\hat{u}_x.$$

The magnetic vector potential terms are therefore:

$$\vec{A}_0 = -B_z^0(y-y_0)\hat{u}_x \quad (27)$$

$$\vec{A}_1 = \frac{1}{2} \cdot \frac{\partial B_z}{\partial y}(z^2 - (y-y_0)^2)\hat{u}_x \quad (28)$$

$$\vec{A}_2 = \frac{1}{3!} \cdot \frac{\partial^2 B_z}{\partial y^2}(y-y_0)(3z^2 - (y-y_0)^2)\hat{u}_x \quad (29)$$

$$\vec{A}_3 = \frac{1}{4!} \cdot \frac{\partial^3 B_z}{\partial y^3}(6(y-y_0)^2 z^2 - z^4 - (y-y_0)^4)\hat{u}_x \quad (30)$$

$$\vec{A}_4 = \frac{1}{5!} \cdot \frac{\partial^4 B_z}{\partial y^4}(y-y_0)(10(y-y_0)^2 z^2 - 5z^4 - (y-y_0)^4)\hat{u}_x \quad (31)$$

The ideal field, given by the vector potential $\vec{A}_0$, is responsible for the ideal motion of a single particle in the trap, governed by $$H_0 = \frac{(\vec{p} - \vec{A}_0)^2}{2m} + q \cdot \phi(x, y, z).$$

The terms $\vec{A}_1$, $\vec{A}_2$, $\vec{A}_3$, $\vec{A}_4$ . . . , represent deviations to the ideal magnetic field, and produce perturbations of the ideal motion. The main effect of these perturbations is the change of the trapping frequencies $\omega_p$, $\omega_z$ and $\omega_m$. If the deviations, $\vec{A}_1$, $\vec{A}_2$, $\vec{A}_3$, $\vec{A}_4$ . . . , are not eliminated, then the eigenfrequencies become dependent on the energies of the trapped particle. The cyclotron, magnetron and axial energies are denoted by $E_p$, $E_m$ and $E_z$, respectively. The variation of the frequencies with the energies can be calculated using classical canonical perturbation theory (see for instance the book by H. Goldstein "Classical Mechanics"). As an example, the effect of $\vec{A}_2$ is calculated below.

The term $\vec{A}_2$ represents a magnetic bottle, since it is created by the curvature of the magnetic field $$\frac{\partial^2 B_z}{\partial y^2}.$$

Remembering that the perturbation Hamiltonian is $$\Delta H = -\frac{q}{m}\vec{p} \cdot \Delta \vec{A} + \frac{q^2}{m}\vec{A}_0 \cdot \Delta \vec{A},$$

where $\Delta \vec{A}$ must be substituted by $\vec{A}_2$. Performing the corresponding algebra (taking into account that $\vec{p} = m\vec{v} + q\vec{A}_0$), the expression for the corresponding perturbative Hamiltonian $$\Delta H(t) = -\frac{q}{6} \cdot \frac{\partial^2 B_z}{\partial y^2} x(y - y_0)(3z^2 - (y - y_0)^2)$$

is obtained. With this, first order perturbation theory can be applied to obtain the frequency shifts matrix (equivalent to the frequency shifts matrix for electric anharmonicities introduced in equation 10). Proceeding as in that case, the matrix of the frequency deviations caused by the magnetic bottle is the following:

$$\begin{pmatrix} \Delta v_p \\ \Delta v_z \\ \Delta v_m \end{pmatrix} = \frac{qB_2}{8\pi^3 m^2} \begin{pmatrix} \frac{\eta_p^3}{\gamma_p^2 v_p^2} & -\frac{\eta_p \xi_p}{\gamma_p v_z^2} & \frac{\eta_p \eta_m (\eta_p \xi_m v_m + \eta_m \xi_p v_p)}{\gamma_p v_p \left(v_m^2 - \frac{v_z^2}{2}\right)} \\ -\frac{\eta_p \xi_p}{\gamma_p v_z v_p} & 0 & -\frac{\eta_m \xi_m v_m}{v_z \left(v_m^2 - \frac{v_z^2}{2}\right)} \\ \frac{\eta_p \eta_m v_m (\eta_p \xi_m v_m + \eta_m \xi_p v_p)}{\gamma_p v_p^2 \left(v_m^2 - \frac{v_z^2}{2}\right)} & -\frac{\eta_m \xi_m v_m^2}{v_z^2 \left(v_m^2 - \frac{v_z^2}{2}\right)} & \frac{\eta_m^3 \xi_m v_m^2}{\left(v_m^2 - \frac{v_z^2}{2}\right)} \end{pmatrix} \begin{pmatrix} \Delta E_p \\ \Delta E_z \\ \Delta E_m \end{pmatrix} \quad (32)$$

In equation (32) the inhomogeneity of the magnetic bottle has been introduced $$B_2 = \frac{1}{2!} \frac{\partial^2 B_z}{\partial y^2}.$$

in general, the magnetic inhomogeneities are defined as $$B_n = \frac{1}{n!} \cdot \frac{\partial^n B_z}{\partial y^n}.$$

Expressions equivalent to those of equation (32) can be derived for any $B_n$. The expressions are not further relevant; important is the fact that if not eliminated the magnetic inhomogeneities produce fluctuations in the frequencies of the trapped charged particles with the energies. These fluctuations would render the technology not useful for mass spectrometry, circuit-QED or any of the applications envisaged. Now, according to equations 27-31, the terms $B_1$, $B_2$, $B_3$, $B_4 \ldots B_n$ fully define the overall homogeneity of the magnetic field in the trapping position (0, $y_0$, 0). The essential idea is that our technology provides the means to eliminate all inhomogeneities $B_1$, $B_2$, $B_3$, $B_4 \ldots B_n$. This magnetic compensation is achieved with the magnetic elements included in the chip, that is, with the so-called shim-pairs. In FIG. 1 the magnetic elements 15,16 and 17,18 allow for eliminating the coefficients $B_1$ and $B_2$. In general, the quantity of inhomogeneities that can be eliminated n is equal to the number n of shim-pairs in the chip.

Compensation of magnetic inhomogeneities $B_1$, $B_2$, $B_3$, $B_4 \ldots B_n$ by the chip is illustrated below. For the sake of mathematical simplicity it will be assumed that the magnetic field created by the magnetic elements is well described with the formula for a magnetic field created by an infinitely long and thin wire ($\mu_0$ is the magnetic permeability):

$$\vec{B} = \frac{\mu_0 I}{2\pi \sqrt{y^2 + (d/2)^2}} \left( \frac{d/2}{\sqrt{y^2 + (d/2)^2}} \hat{u}_z + \frac{y}{\sqrt{y^2 + (d/2)^2}} \hat{u}_y \right) \quad (33)$$

Equation 33 is valid for a wire placed at d/2 to the right of the main wire (element 14 in FIG. 1). If the finite rectangular cross section or the finite length of the wire is to be taken into account, then the mathematical formula in equation (33) will be different, but in any case the magnetic field will be proportional to the current I running along the wire (or the current density J). For a wire placed at d/2 to the left of the main wire (element 14 in FIG. 1) the magnetic field is (again assuming an infinitely long and thin wire)

$$\vec{B} = \frac{\mu_0 I}{2\pi \sqrt{y^2 + (d/2)^2}} \left( \frac{d/2}{\sqrt{y^2 + (d/2)^2}} \hat{u}_z - \frac{y}{\sqrt{y^2 + (d/2)^2}} \hat{u}_y \right) \quad (34)$$

With equations 33 and 34, the magnetic field created by one shim pair at the symmetry axis of the chip ($\hat{u}_y$) is given. The total field of the shim-pair is therefore:

$$\vec{B} = \frac{\mu_0 I d}{2\pi (y^2 + (d/2)^2)} \hat{u}_z \quad (35)$$

With equation 35 the derivatives of the magnetic field created by the shim-pair at the vertical axes (0, y, 0) can be easily obtained. The formulas are:

$$\frac{\partial B_z}{\partial y} = -\frac{\mu_0 I}{2\pi} \cdot \frac{2dy}{\left(y^2 + \left(\frac{d}{2}\right)^2\right)^2}; \quad \frac{\partial^2 B_z}{\partial y^2} = -\frac{\mu_0 I}{2\pi} \cdot \frac{d(d^2 - 12y^2)}{\left(y^2 + \left(\frac{d}{2}\right)^2\right)^3} \quad (36)$$

$$\frac{\partial^3 B_z}{\partial y^3} = \frac{\mu_0 I}{2\pi} \cdot \frac{dy(d^2 - 4y^2)}{6\left(y^2 + \left(\frac{d}{2}\right)^2\right)^4}; \quad \frac{\partial^4 B_z}{\partial y^4} = \frac{\mu_0 I}{2\pi} \cdot \frac{3d(d^4 - 40d^2 y^2 + 80y^4)}{2\left(y^2 + \left(\frac{d}{2}\right)^2\right)^5}$$

The magnetic compensation (elimination of $B_1$, $B_2$, $B_3$, $B_4 \ldots B_n$) can now be illustrated with the formulas of equation (36). It is assumed that the chip is fabricated with 4 such shim-pairs plus the main wire. Each shim-pair is placed at a distance $d_i/2$ from the main wire, with the current $I_i$ and the corresponding magnetic field denoted by $B_z^i$. The compensation means finding the currents of the shim-pairs $I_1$, $I_2$, $I_3$ and $I_4$ such that the total inhomogeneity up to the fourth order vanishes:

$$\frac{\partial B_z^1}{\partial y} + \frac{\partial B_z^2}{\partial y} + \frac{\partial B_z^3}{\partial y} + \frac{\partial B_z^4}{\partial y} = -\frac{\partial B_z^0}{\partial y} \quad (37)$$

-continued $$\frac{\partial^2 B_z^1}{\partial y^2} + \frac{\partial^2 B_z^2}{\partial y^2} + \frac{\partial^2 B_z^3}{\partial y^2} + \frac{\partial^2 B_z^4}{\partial y^2} = -\frac{\partial^2 B_z^0}{\partial y^2}$$

$$\frac{\partial^3 B_z^1}{\partial y^3} + \frac{\partial^3 B_z^2}{\partial y^3} + \frac{\partial^3 B_z^3}{\partial y^3} + \frac{\partial^3 B_z^4}{\partial y^3} = -\frac{\partial^3 B_z^0}{\partial y^3}$$

$$\frac{\partial^4 B_z^1}{\partial y^4} + \frac{\partial^4 B_z^2}{\partial y^4} + \frac{\partial^4 B_z^3}{\partial y^4} + \frac{\partial^4 B_z^4}{\partial y^4} = -\frac{\partial^4 B_z^0}{\partial y^4}$$

The compensation in equation 37 shows that the currents $I_i$ have to adjusted such that the inhomogeneity of the main wire $$\frac{\partial^n B_z^0}{\partial y^n}$$

is compensated by the inhomogeneities of the shim-pairs. With the expressions for the derivatives of equation (36) this gives:

$$-\frac{\mu_0 I_1}{2\pi} \frac{2d_1 y}{\left(y^2 + \left(\frac{d_1}{2}\right)^2\right)^2} - \frac{\mu_0 I_2}{2\pi} \frac{2d_2 y}{\left(y^2 + \left(\frac{d_2}{2}\right)^2\right)^2} - \tag{38}$$

$$\frac{\mu_0 I_3}{2\pi} \frac{2d_3 y}{\left(y^2 + \left(\frac{d_3}{2}\right)^2\right)^2} - \frac{\mu_0 I_4}{2\pi} \frac{2d_4 y}{\left(y^2 + \left(\frac{d_4}{2}\right)^2\right)^2} = -\frac{\partial B_z^0}{\partial y}$$

$$-\frac{\mu_0 I_1}{2\pi} \cdot \frac{d_1(d_1^2 - 12y^2)}{\left(y^2 + \left(\frac{d_1}{2}\right)^2\right)^3} - \frac{\mu_0 I_2}{2\pi} \cdot \frac{d_2(d_2^2 - 12y^2)}{\left(y^2 + \left(\frac{d_2}{2}\right)^2\right)^3} -$$

$$\frac{\mu_0 I_3}{2\pi} \cdot \frac{d_3(d_3^2 - 12y^2)}{\left(y^2 + \left(\frac{d_3}{2}\right)^2\right)^3} - \frac{\mu_0 I_4}{2\pi} \cdot \frac{d_4(d_4^2 - 12y^2)}{\left(y^2 + \left(\frac{d_4}{2}\right)^2\right)^3} = -\frac{\partial^2 B_z^0}{\partial y^2}$$

$$\frac{\mu_0 I_1}{2\pi} \cdot \frac{d_1 y(d_1^2 - 4y^2)}{6\left(y^2 + \left(\frac{d_1}{2}\right)^2\right)^4} + \frac{\mu_0 I_2}{2\pi} \cdot \frac{d_2 y(d_2^2 - 4y^2)}{6\left(y^2 + \left(\frac{d_2}{2}\right)^2\right)^4} +$$

$$\frac{\mu_0 I_3}{2\pi} \cdot \frac{d_3 y(d_3^2 - 4y^2)}{6\left(y^2 + \left(\frac{d_3}{2}\right)^2\right)^4} + \frac{\mu_0 I_4}{2\pi} \cdot \frac{d_4 y(d_4^2 - 4y^2)}{6\left(y^2 + \left(\frac{d_4}{2}\right)^2\right)^4} = -\frac{\partial^3 B_z^0}{\partial y^3}$$

$$\frac{\mu_0 I_1}{2\pi} \cdot \frac{3d_1(d_1^4 - 40d_1^2 y^2 + 80y^4)}{2\left(y^2 + \left(\frac{d_1}{2}\right)^2\right)^5} + \frac{\mu_0 I_2}{2\pi} \cdot \frac{3d_2(d_2^4 - 40d_2^2 y^2 + 80y^4)}{2\left(y^2 + \left(\frac{d_2}{2}\right)^2\right)^5} +$$

$$\frac{\mu_0 I_3}{2\pi} \cdot \frac{3d_3(d_3^4 - 40d_3^2 y^2 + 80y^4)}{2\left(y^2 + \left(\frac{d_3}{2}\right)^2\right)^5} +$$

$$\frac{\mu_0 I_4}{2\pi} \cdot \frac{3d_4(d_4^4 - 40d_4^2 y^2 + 80y^4)}{2\left(y^2 + \left(\frac{d_4}{2}\right)^2\right)^5} = -\frac{\partial^4 B_z^0}{\partial y^4}$$

In the expression of the matrix MB, the general position coordinate y must be substituted by the position of the trapped particles $y_0$ when the compensation is to be performed at that position (which is usually the case). In general the determinant of MB is different form zero, therefore the matrix MB can be inverted. With the inverted matrix $MB^{-1}$ the proper compensation currents to be applied to the shim-pairs can be easily found:

$$\begin{pmatrix} I_1 \\ \vdots \\ I_n \end{pmatrix} = \frac{2\pi}{\mu_0} MB^{-1} \begin{pmatrix} -\frac{\partial B_z^0}{\partial y} \\ \vdots \\ -\frac{\partial^n B_z^0}{\partial y^n} \end{pmatrix} \tag{41}$$

In general the design of a concrete chip consists in optimizing the matrix MB, such that the positions of the shim-pairs relative to the main wire ($d_i$) will be chosen in order to guarantee that the values of the currents obtained from equation (41) are below the value for the critical current of the superconducting material employed. The expression of MB in equation (40) has been derived assuming infinitely long and infinitely thin wires. If the wires are not infinitely thin, the expression for MB will be different, but the generality of the solution (41) is still valid, since the linearity of the problem of finding the compensation currents is guaranteed by the universal linear dependence of the magnetic field with the current I (or current density J) resulting from Maxwell's equations. The shim-pairs must be distributed symmetrically (along the $\hat{u}_z$ axis) with respect to the main wire (14 in FIG. 1). The shim-pairs 15,16 and 17,18 shown in FIG. 1 are placed on the same plane as the main wire 14, but this is not strictly necessary. The shim-pairs 15, 16, 17, 18 may be placed in plane above the main wire, and it may be also possible to place different shim-pairs at different planes. In general the shim-pairs 15, 16, 17, 18 are responsible for cancelling the magnetic inhomogeneities but not for creating the bulk magnetic field. Therefore it is mostly convenient that the cross section of the shim wires be smaller than that of the main wire. The decision of placing the shim-wires whether at the same plane as the main wire or at a different plane will also depend on the costs of fabrication of the chip. In general the design of a particular chip is determined by the matrix MB. The thickness of the shim-wires, the positions $d_i$, and the planes at which they are placed can vary, but the condition sine qua non for a good chip design is that the matrix MB must be invertible at $y_0$ and the solutions for the shim-currents of equation 41 must be "physical", i.e. the values of $I_1 \ldots I_n$ must be sustainable by the materials employed.

To illustrate the general working principle with a concrete example, the following values for the dimensions of the magnetic elements are assumed:

$l_p = 50.00$ mm $\quad w_p = 10.00$ mm $\quad$ (main magnetic element)

$l_{s1} = 50/15$ mm $\quad w_{s1} = w_p/3$ mm $\quad d_{s1} = 10.00$ mm $\quad$ ($1^{st}$ shim-pair)

$l_{s2} = 50/15$ mm $\quad w_{s2} = w_p/3$ mm $\quad d_{s2} = 20.00$ mm $\quad$ ($2^{nd}$ shim-pair)

$l_{s3} = 50/15$ mm $\quad w_{s3} = w_p/3$ mm $\quad d_{s3} = 30.00$ mm $\quad$ ($3^{rd}$ shim-pair)

$l_{s4} = 50/15$ mm $\quad w_{s4} = w_p/3$ mm $\quad d_{s4} = 40.00$ mm $\quad$ ($4^{th}$ shim-pair)

Figure 19:
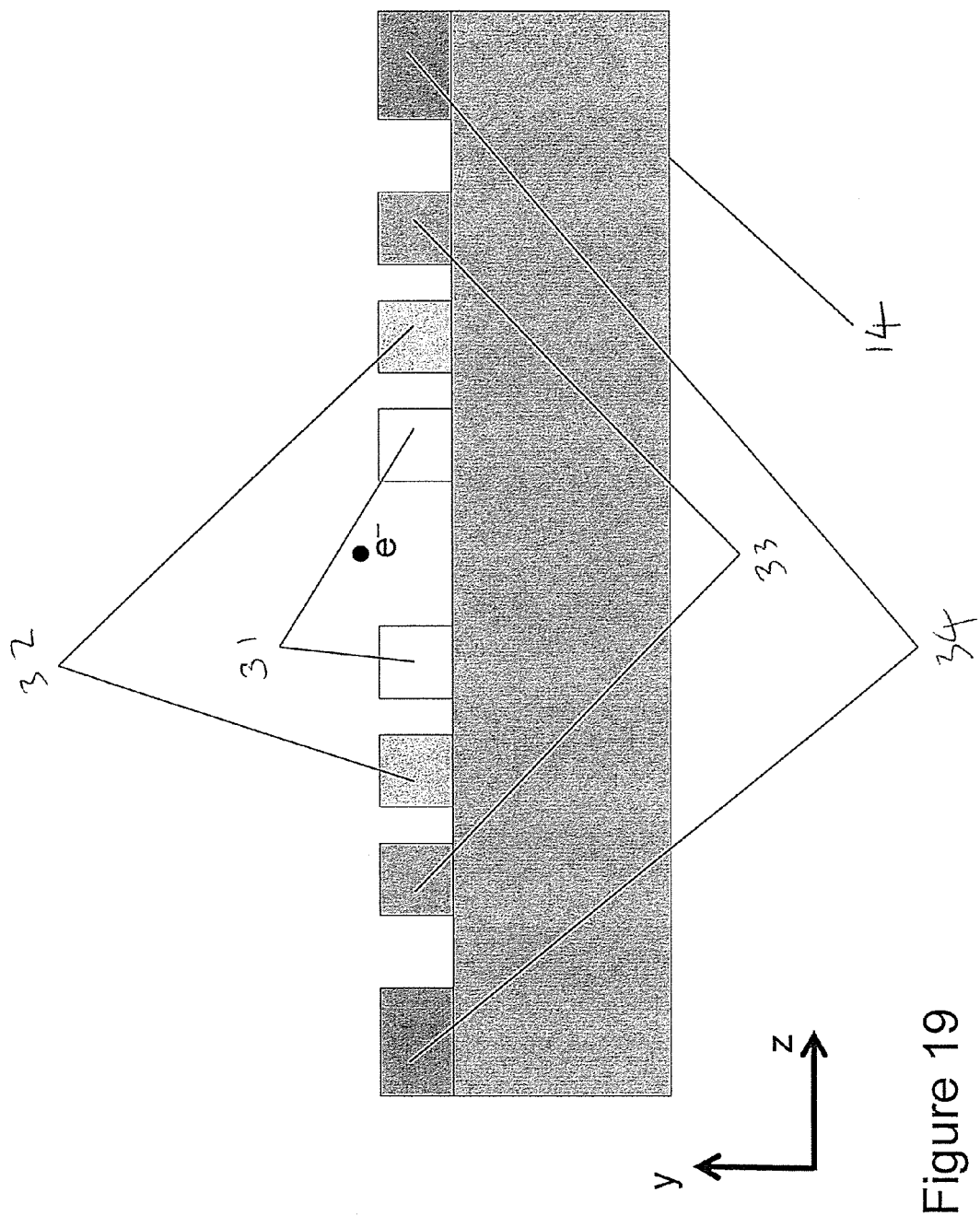
FIG. 19 is a schematic illustration of the magnetic elements, in this case with the shim-pairs placed above the main magnetic element.

It is assumed the magnetic elements implementing the shim-pairs 31, 32, 33, 34 are all placed on top of the main magnetic element 14. This is shown in FIG. 19. The trapped electron is assumed to be at a position $y_0=0.820$ mm above the surface of the array of electrodes (not shown in FIG. 19). Hence, the magnetic elements 14, 31, 32, 33, 34 plotted in FIG. 19 substitute the array 13 of magnetic elements 14, 15, 16, 17, 18 shown in FIG. 1. A current density along the main magnetic element 14 of $J_0=81.48$ A/mm$^2$ is assumed. The main magnetic element 14 may be a solid block of superconducting material properly magnetized to sustain an equivalent current density. Alternatively the main magnetic element 14 can be made of an array of thin superconducting wires. In the latter case, for instance, assuming thin wires with a radius of 0.25/2 mm, it would be necessary to have an array of 200 turns distributed over 40 vertical layers which in total would occupy the same volume as the solid block of cross section $l_p \times w_p$. The current running long each of the thin wires would be 4.0 Ampere. In both cases, the wires or the solid block must be long "enough", such that at the position of the trapped ion $(0, y_0, 0)$ only current components along the direction $\hat{u}_y$ are visible. The ideal solution would be, as mentioned previously, to have infinitely long wires. Two practical solutions circumvent this demand. They will be discussed in detail in later paragraphs, now for the purpose of this illustrating example, it is simply assumed that the wires are infinitely long. The matrix MB for the example is:

$$MB = \begin{pmatrix} 0.874002 & 0.369749 & 0.181921 & 0.127718 \\ -0.502579 & -0.0540262 & -0.0119514 & -0.00380739 \\ 0.0565019 & -0.0133297 & -0.00394869 & -0.00140489 \\ 0.169422 & 0.00852214 & 0.000957463 & 0.000146981 \end{pmatrix} 1/\text{mm}^2 \quad (42)$$

The inhomogeneities of the magnetic field produced by the main magnetic element are given by (units Gauss/mm$^n$):

$$\begin{pmatrix} \frac{\partial B_z^0}{\partial y} \\ \frac{\partial^2 B_z^0}{\partial y^2} \\ \frac{\partial^3 B_z^0}{\partial y^3} \\ \frac{\partial^4 B_z^0}{\partial y^4} \end{pmatrix} = \begin{pmatrix} -\frac{114.29}{1!} \\ \frac{2.814}{2!} \\ \frac{0.17455}{3!} \\ -\frac{0.03453}{4!} \end{pmatrix} \quad (43)$$

Solving for the currents in equation 41 gives the shim-current densities:

$$\begin{pmatrix} J_1 \\ J_2 \\ J_3 \\ J_4 \end{pmatrix} = \begin{pmatrix} 11.708 \\ -429.699 \\ 1885.17 \\ -626.481 \end{pmatrix} A/\text{mm}^2 \quad (44)$$

All current densities are below the critical values for Niobium Titanium or YBCO (below 2 T fields). The example also shows that in order to avoid the current densities becoming too high, it is convenient to have the outer shim-pairs with a bigger cross section than the inner ones. This can be easily achieved, simply by increasing $l_{sn}$ and/or $w_{sn}$. The decision on the values for those parameters will depend on the envisaged values for magnetic fields at the planned range for $y_0$, as well as possible fabrication issues. Thus, different shim-pairs may conveniently have different $l_{sn}$, $w_{sn}$.

Figure 20:
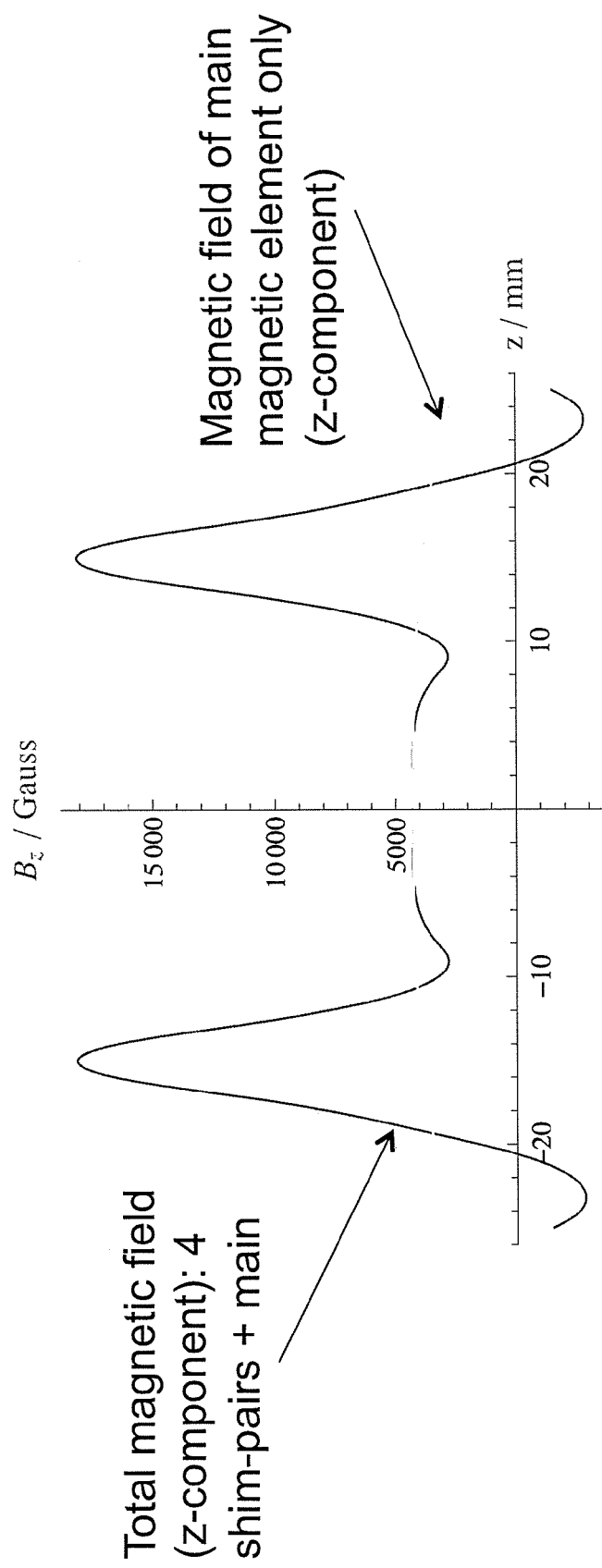
FIG. 20 is a calculated example of the z-component, $B_z$, of the magnetic field along the axes $\hat{u}_z$ with and without magnetic compensation of inhomogeneities.

FIG. 20 shows the magnetic field (u, component) along the z-axes for both the main magnetic element 14 alone and for the main magnetic element 14 plus the four shim-pairs 31, 32, 33, 34. The graph is calculated at the position of the trapped particles $y_0$. It must be noticed that the amplitude of the motion of the trapped particles along $\hat{u}_z$ is below 1 mm for cryogenic temperatures (typically 30 μm for one electron at 4.2 K). Therefore, the relevant range within which the total magnetic field must be homogeneous is centred around $z=0$ (see FIG. 20) and spans only a few mm. The symmetric peaks of the magnetic field at $z \cong 15$ mm are due to the third shim-pair 33, but their position is too far away from $z=0$ to affect the motion of the trapped particles.

Figure 21:
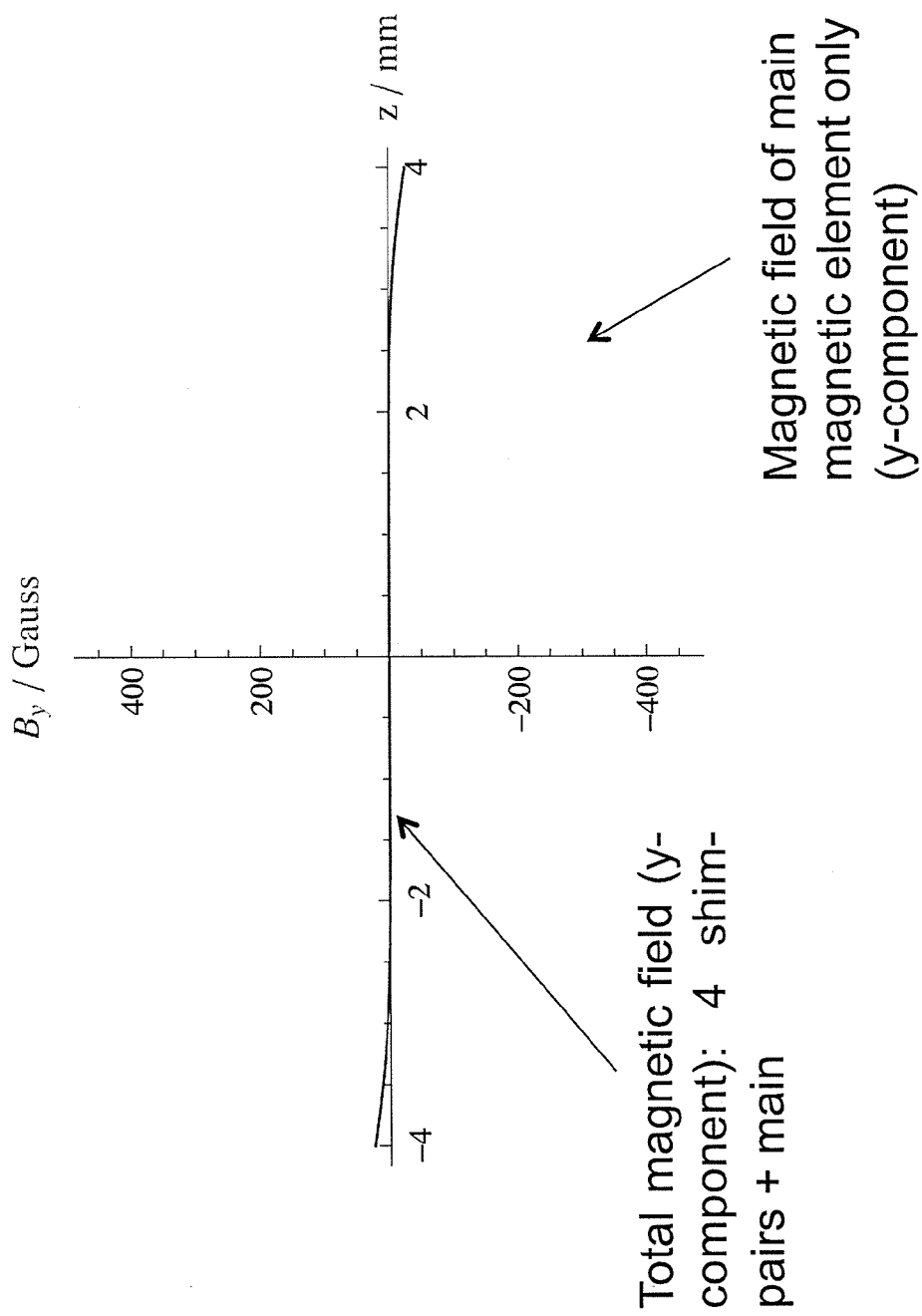
FIG. 21 is a calculated example of the y-component of the magnetic field along the axes $\hat{u}_z$ with and without magnetic compensation. The undesired vertical component of the magnetic field, $B_y$, is shown to vanish with the compensation.

FIG. 21 shows the magnetic field ($\hat{u}_y$ component) along the z-axes for both the main magnetic element 14 alone and for the main magnetic element 14 plus the four shim-pairs 31, 32, 33, 34. The graph shows that thanks to the magnetic compensation, the $\hat{u}_y$ component of the total magnetic field disappears. The remaining magnetic field is purely axial, i.e. with only a $\hat{u}_z$ component. This means the ion trap may work precisely. A component of the field along the $\hat{u}_y$ axes would produce big shifts of the eigen-frequencies $\omega_p$, $\omega_z$ and $\omega_m$ with the particles' energies. This is avoided with the magnetic compensation. It must be noticed in FIG. 21, that the range within which $B_y \cong 0$ spans a few mm, much wider than the actual amplitude of the particles' motion at cryogenic temperatures. Hence, within the relevant range of a few mm around $(0, y_0, 0)$ the compensated magnetic field is oriented along $\hat{u}_z$.

Figure 22:
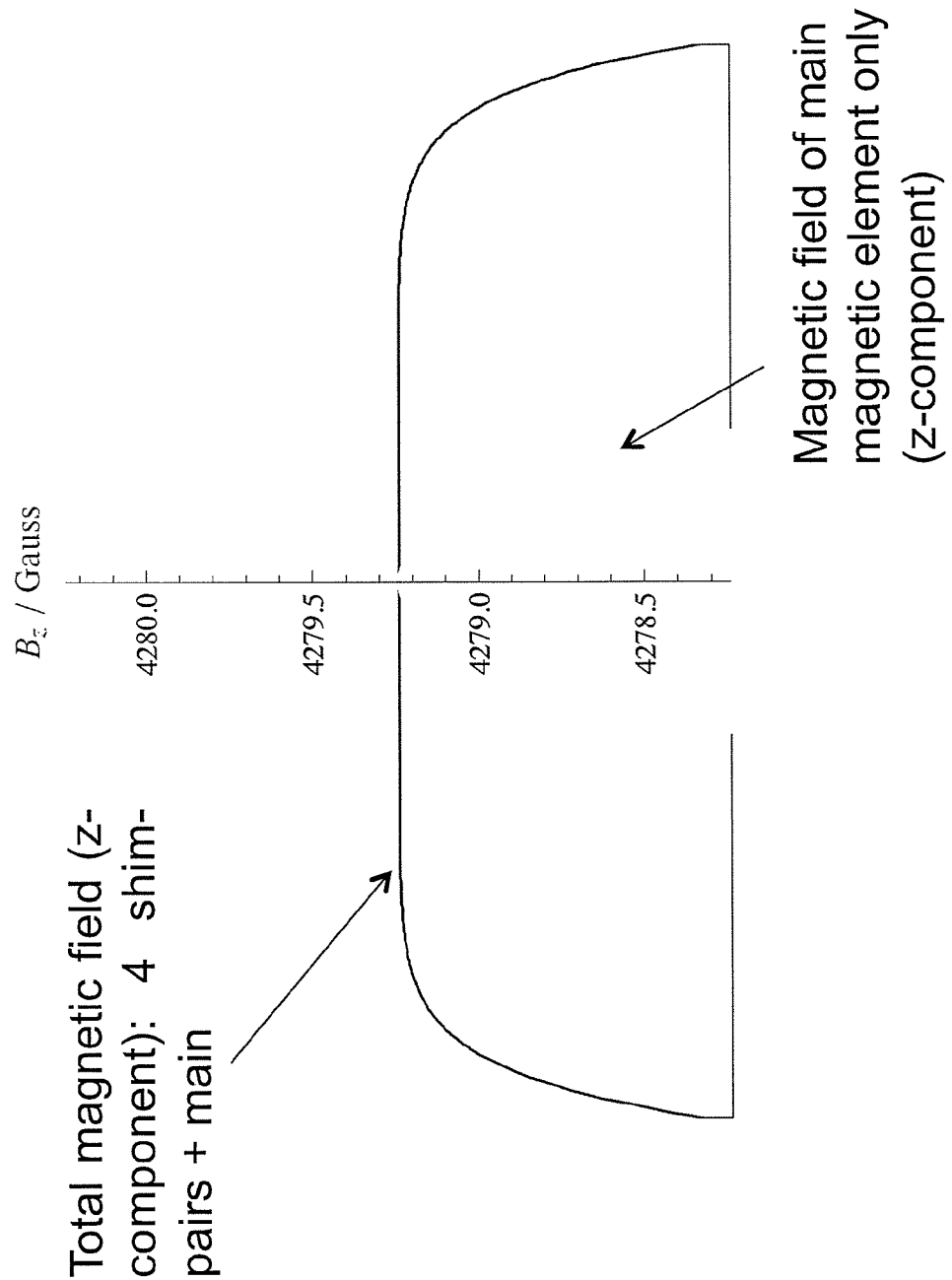
FIG. 22 zooms the same calculated example as in FIG. 20 in a smaller area around the interesting trapping position (0, $y_0$, 0).

FIG. 22 shows the magnetic field ($\hat{u}_z$ component) along the z-axes for both, the main magnetic element alone and for the main magnetic element plus the four shim-pairs. The graph is a zoom of FIG. 20 around $(0, y_0, 0)$. It shows in detail the effect of the magnetic compensation along the z-axes.

Figure 23:
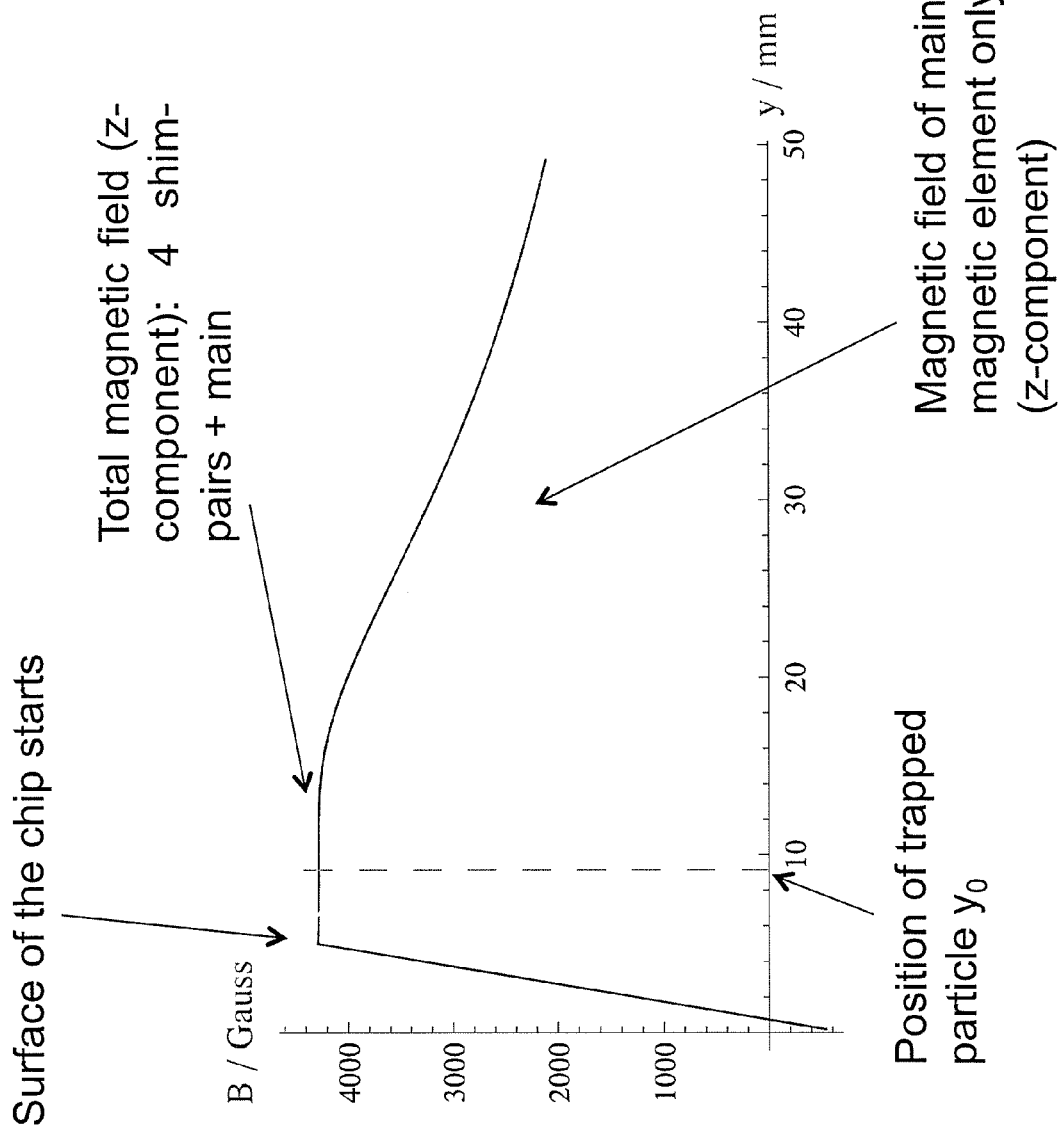
FIG. 23 is a calculated example of the z-component, $B_z$, of the magnetic field along the vertical axes $\hat{u}_y$, with and without magnetic compensation of inhomogeneities. It shows how the homogeneity of $B_z$ is achieved.

FIG. 23 shows the magnetic field ($\hat{u}_z$ component) along the y-axes for both, the main magnetic element 14 alone and for the main magnetic element 14 plus the four shim-pairs 31, 32, 33, 34. The positive effect of the magnetic compensation is clearly visible. While the magnetic field of the main magnetic element 14 alone drops rapidly with the vertical distance (y) to the surface of the chip, the compensated magnetic field shows a flat plateau centred around the position of the trapped charged particles $(0, y_0, 0)$. The flat plateau spans a few mm, in any case much bigger than the amplitude of the motion of the particles at cryogenic temperatures. This shows that the compensation properly forms a homogenous magnetic field region. This is the key factor, which renders the technology useful for ion trapping and applications in circuit-QED, high-precision mass spectrometry and others.

Figure 24:
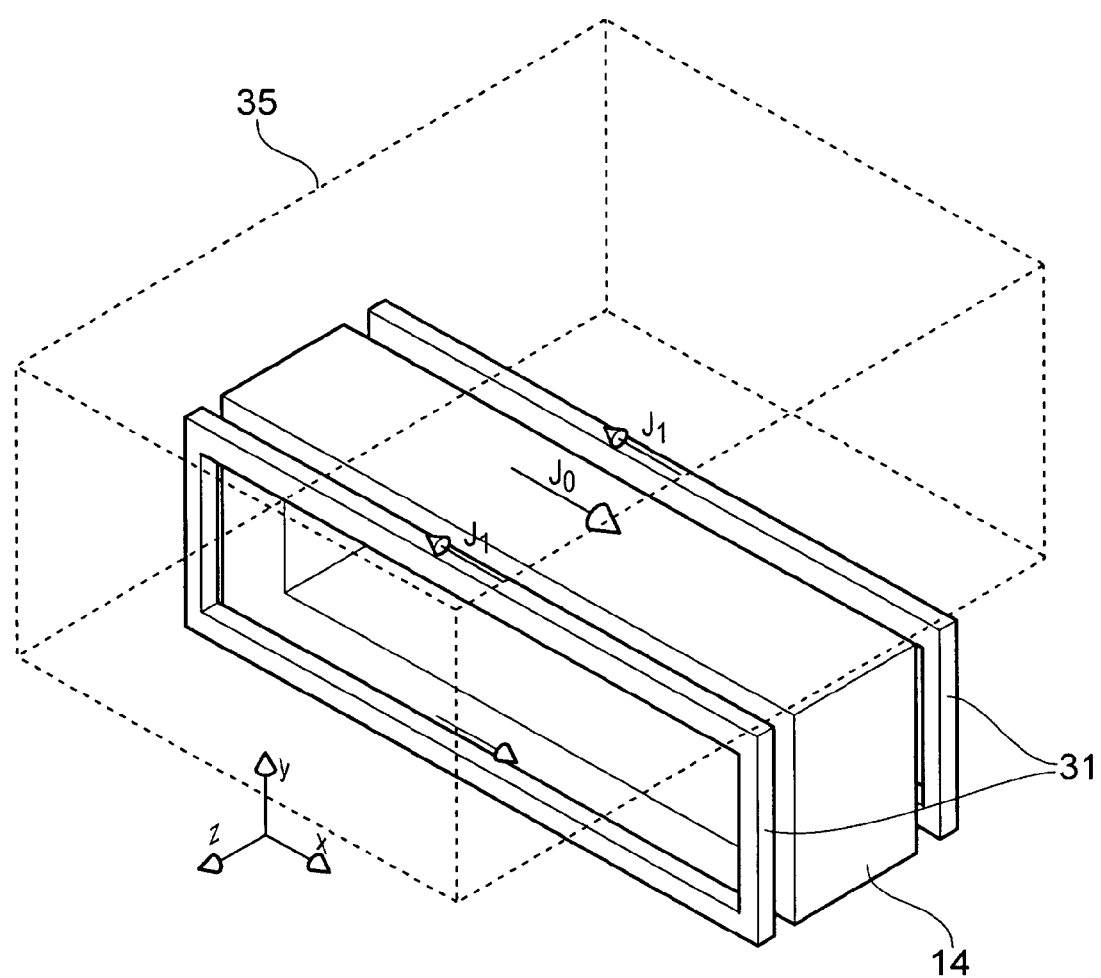
FIG. 24 is a schematic illustration of the magnetic elements fabricated with closed-loop wires and enclosed in a superconducting shielding case.
Figure 25:
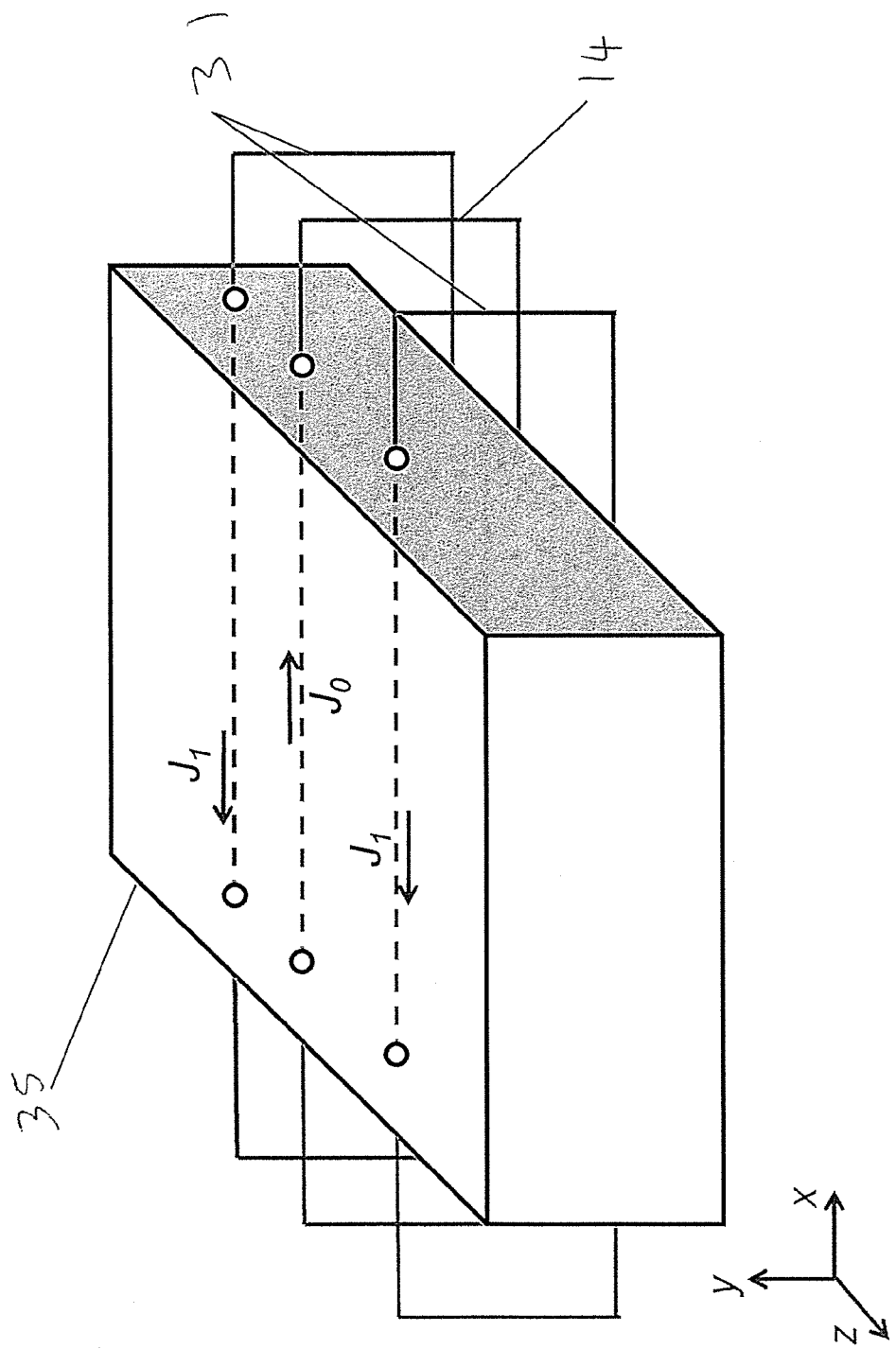
FIG. 25 is a schematic illustration of the currents enclosed in the superconducting shielding case.

Now it is necessary to address the question regarding the finite length of the employed magnetic elements. Below are provided two possible technical solutions to this issue. The magnetic elements can be a) either closed loop wires carrying a superconducting current density or b) magnetised blocks of superconducting material with a constant and homogeneous magnetic dipole moment density. In case a) the trapping region must be enclosed by a superconducting shielding case, such that from the position $(0, y_0, 0)$ the magnetic elements (14,15,16,17,18 in FIGS. 2 and 14, 31, 32, 33, 34 in FIG. 19) only currents running along the axis $\hat{u}_x$. FIGS. 24 and 25 show a sketch of the chip enclosed by a superconducting shielding box 35 (the electrodes of the ion trap inside the box 35 are not shown). The example shows how the magnetic elements 14, 31 are actually closed loop wires, along which a persistent superconducting current is running. With the superconducting shield, the trapping region around (0, $y_0$, 0) only "sees" currents running along the axis $\hat{u}_x$. Therefore, the hypotheses of the mathematic analysis described in the preceding paragraphs are perfectly met: the assumed symmetries do apply and the results obtained are fully valid. If the superconducting case, or any other type of magnetic shielding, is not included then the closed loop wires will have current components running in directions other than $\hat{u}_x$ and the validity of the exposed mathematical analysis is not exact. This means that the degree of homogeneity of the magnetic field achieved at (0, $y_0$,0) may be lower than that achieved with the shielding case. The proposed technology would still work, permitting all the applications listed in the preceding sections, however ultra high precision will not be possible at the same level as it is with the use of the magnetic shield.

Figure 26:
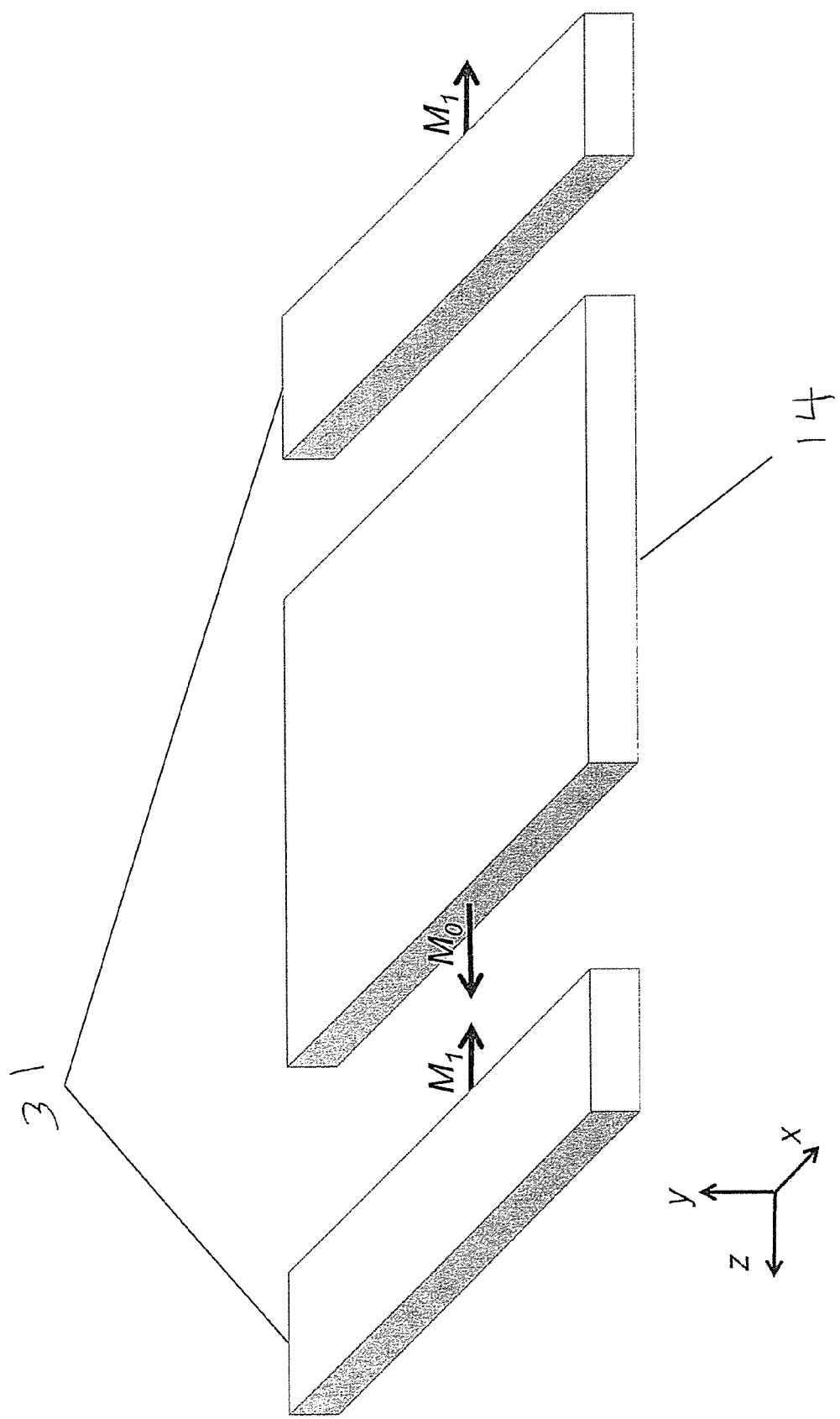
FIG. 26 is a sketch of the magnetic elements fabricated with high temperature superconductors. The graph shows the corresponding magnetic dipole densities.

Case b) is now referred to where the magnetic elements are magnetised blocks of superconducting material with a constant and homogeneous magnetic dipole moment density. In this case, the structure of the magnetic elements is simplified over the case a), and the use of a superconducting shielding case is not required to avoid current components in directions other than $\hat{u}_x$. A sketch of the magnetic elements 14, 31 is shown in FIG. 26. In that figure $M_0$ is the magnetic dipole density of the main magnetic element and $M_1$ is the magnetic dipole density of the first shim-pair. Both $M_0$ and $M_1$ have to be homogenous densities. This type of magnetic structures can be fabricated preferentially with high temperature superconducting materials, such as YBCO, but also with any other ferromagnetic materials, such as Cobalt, Iron and Nickel.

FIG. 26 does not show the elements required for magnetizing the magnetic elements. There are different known ways of magnetising/demagnetising high temperature superconductors or ferromagnets. For instance by using thermal pulses applied to the superconductors in the presence of a small "seeding" magnetic field. The magnetisation methods have been described elsewhere and are known to the skilled person. The same argument applies to the case of using closed loop low temperature superconductors (see FIGS. 24 and 25). These closed-loop wires must be energized/de energized in situ, that is, during the operation of the ion trap. Again, different technologies are available, such as superconducting flux pumps or room-temperature power supplies employed with cryogenic superconducting switches. One of these technologies will be necessarily part of the ion trap; the employed option may be different, depending on the particular application envisaged for a particular ion trap. All these energizing technologies have been described in detail elsewhere and are known to the skilled person.

The magnetic field of the earth may be taken into account for a correct compensation of the total magnetic field in the trapping region. Now, the Earth's magnetic field is of the order of 0.5 Gauss depending on the position. For the scale of the motion of the trapped charged particles in the ion trap (several microns), the earth's field, $\vec{B}_{earth}$, can be considered as homogeneous. However, in general it will have components in all directions of space:

$$\vec{B}_{earth} = (B_x^{earth}, B_y^{earth}, B_z^{earth}) \quad (45)$$

With the ion trap 1 as shown in FIGS. 1 and 2 and the magnetic elements as shown in FIGS. 19, 24, 25 and 26 it is possible to compensate for the y component of the earth's field: $B_y^{earth}=0$. The component along the z-axes, $B_z^{earth}$, will simply add to the total trapping field along that direction, thus it has no negative effect upon the operation of the ion trap. The component along the x-axes however, does affect negatively the operation of the trap. With the magnetic elements shown in FIGS. 1, 2, 19, 24, 25 and 26, $B_x^{earth}$ cannot be eliminated. The earth's magnetic field may be eliminated within the experimental region with some external coils. However, the optimum solution is to employ similar magnetic compensation shim-pairs as those shown in the mentioned figures, however rotated 90 degrees along the y-axes. The resulting total magnetic structure is sketched in FIG. 27 (with the electrodes of the ion trap 1, above the magnetic elements, not shown). The magnetic elements 36, 37 are now oriented parallel to the z-axes and so is the sense of the compensation currents $I_0^x, I_1^x \ldots I_m^x$. Figure shows 27 only one shim-pair 37 for compensating $B_x^{earth}$ (or any remaining magnetic field component along the x-axes, whatever its origin). More shim-pairs could be added, up to m, depending on the degree of compensation to required. The shim-pairs 37 are placed symmetrically across the x-axes. There is one main magnetic element 36, with current $I_0^x$, and up to m shim-pairs with currents $I_1^x \ldots I_m^x$. The shim pairs 37 are symmetrical with respect to the main magnetic element for compensating $B_x^{earth}$. The principle of the compensation is identical to what has been discussed in the previous sections. In this case however the shim-currents (denoted by $I_i^x$) have to be chosen such that:

$$\begin{pmatrix} I_1^x \\ \vdots \\ I_m^x \end{pmatrix} = \frac{2\pi}{\mu_0} MB_x^{-1} \begin{pmatrix} -\frac{\partial (B_x^{earth} + B_x^0)}{\partial y} \\ \vdots \\ -\frac{\partial^n (B_x^{earth} + B_x^0)}{\partial y^n} \end{pmatrix} \quad (46)$$

Figure 27:
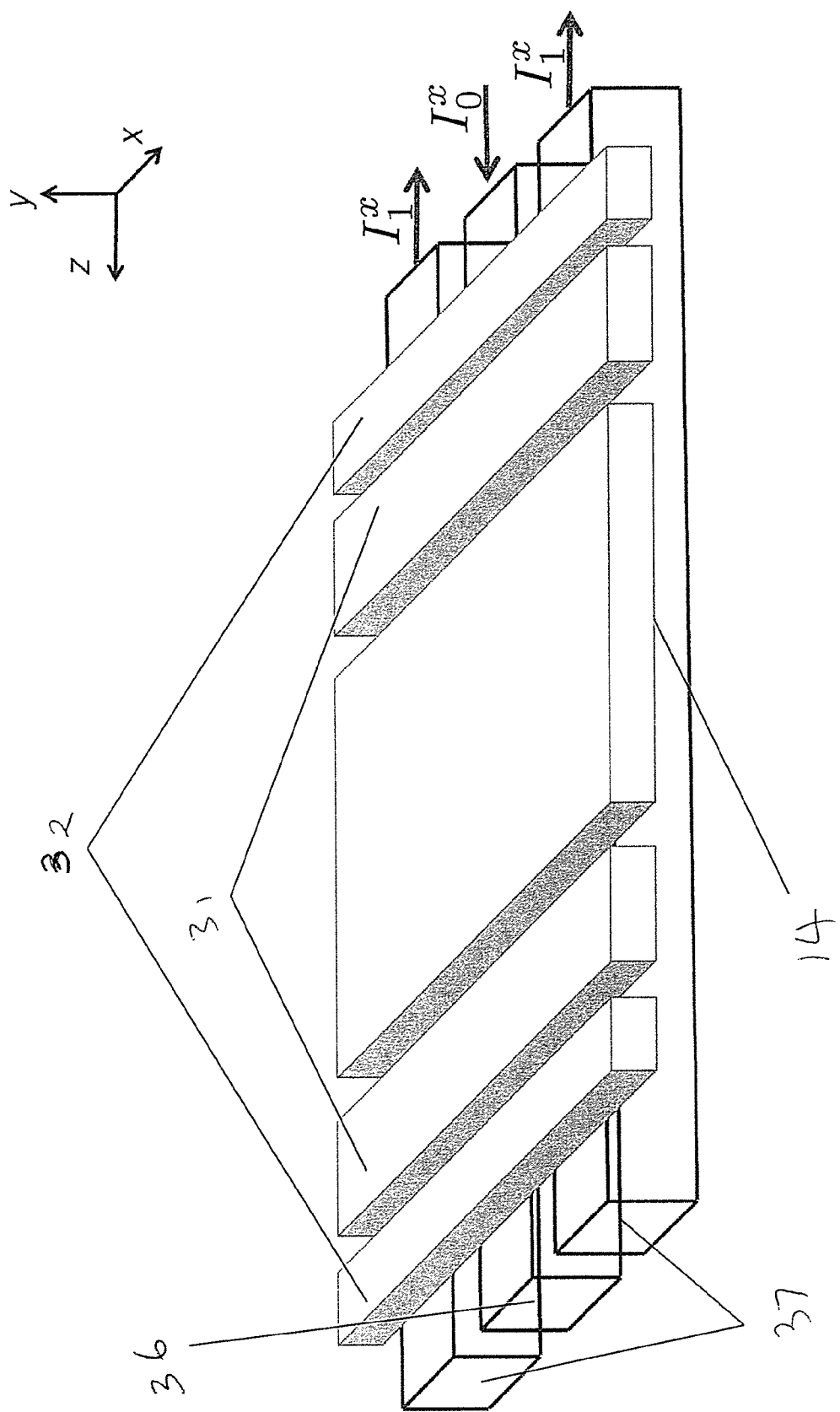
FIG. 27 is a schematic illustration of the magnetic elements for creating the trapping magnetic field and the magnetic elements for eliminating the earth's magnetic field along the $\hat{u}_x$ axes, $B_x^{earth}$.

In equation (46) the matrix $MB_x$ is similar to the matrix MB of equation 40, however for the shim-pairs employed for the compensation of $B_x^{earth}$ (see FIG. 27). Equation (46) states that the shim-currents have to be chosen such, to eliminate the total inhomogeneities of the earth's magnetic field plus those due to the main magnetic element 36 for the compensation of $B_x$ (see FIG. 27). The field created by that main magnetic element 36 is here denoted by $B_x^0$. Now, the main current $I_0^x$ has to be chosen such that the earth's magnetic field vanishes at the trapping position (0, $y_0$, 0). The condition to be fulfilled by $I_0^x$ is therefore: $B_x^{earth}+B_x^0+(B_x^1+ \ldots +B_x^m)=0$. This condition takes also into account the effect of the compensation currents upon the total x-component of the magnetic field: the total field along x must vanish. In equation 46 the earth's field can be considered homogeneous, so the equation can be simplified to:

$$\begin{pmatrix} I_1^x \\ \vdots \\ I_m^x \end{pmatrix} \cong \frac{2\pi}{\mu_0} MB_y^{-1} \begin{pmatrix} -\frac{\partial B_x^0}{\partial y} \\ \vdots \\ -\frac{\partial^n B_x^0}{\partial y^n} \end{pmatrix} \quad (47)$$

The current $I_0^x$ along the main magnetic element 36 for the compensation of $B_x^{earth}$ is shown in FIG. 27. It must be observed that $I_0^x$ a flows along the $\hat{u}_z$-axes. It is also important to observe that the compensation currents $I_1^x \ldots I_m^x$ also flow along the $\hat{u}_z$-axes. Additionally, every $I_i^x$ propagates in the same sense for both components of the pair, as shown in FIG. 27.

Figure 28:
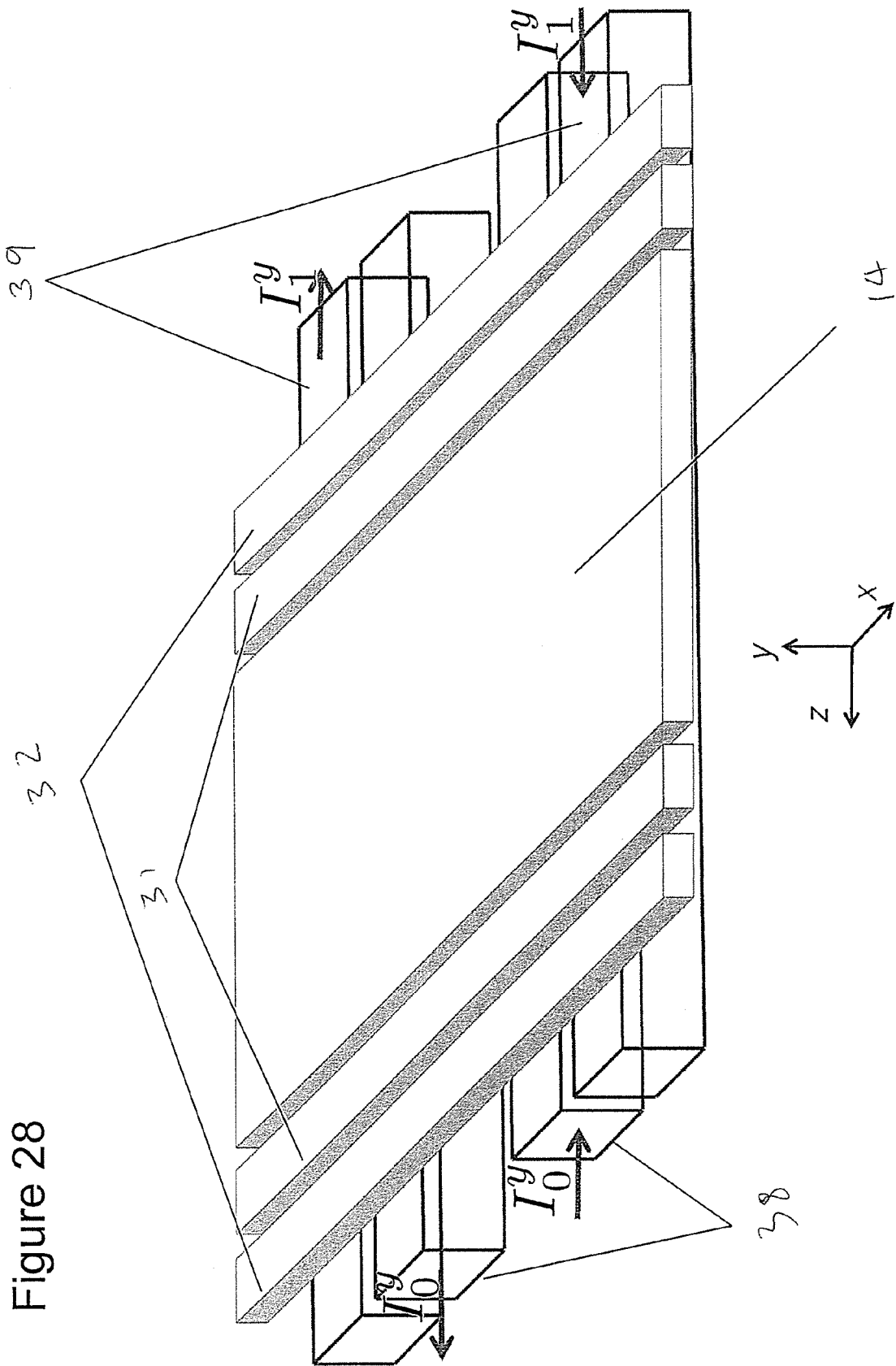
FIG. 28 is a schematic illustration of the magnetic elements for creating the trapping magnetic field and the magnetic elements for eliminating the earth's magnetic field along the $\hat{u}_y$ axes, $B_y^{earth}$.

To finalize this section it is necessary to consider now the compensation of the component $B_y^{earth}$ (or in general the y-component of the magnetic field whatever its origin may be). The compensation of $B_y^{earth}$ is achieved with the additional compensation currents $I_y^0, I_y^1, \ldots I_y^q$. In this case, the main compensation current is $I_y^0$ and it runs along a pair of wires and along the $\hat{u}_z$-axes. This is shown in FIG. 28 (electrodes of the ion trap 1, above the magnetic elements, are not shown and magnetic elements for compensating $B_x$, shown in FIG. 27, not shown). The magnetic elements 38, 39 (wires or superconducting ferromagnets) are parallel to the magnetic elements 36, 37 employed for compensating $B_x^{earth}$. Each magnetic pair 38, 39 is placed symmetrically across the $\hat{u}_x$-axes (i.e. there is invariance under the transformation $x \rightarrow -x$). This is sketched in FIG. 29. Moreover, it is important to observe that the current $I_y^0$ runs in opposite senses in each component of the pair. This is necessary for the magnetic field created by that pair to be oriented along the $\hat{u}_y$-axes at the trapping position $(0, y_0, 0)$. The main compensation current $I_y^0$ must be chosen such, that the overall component of the magnetic field along the y-axes vanishes: $B_y^{earth} + B_y^0 + (B_y^1 + \ldots + B_y^q) = 0$. The shim currents are $I_y^1, \ldots I_y^q$, they are required to eliminate the inhomogeneities of the magnetic field created by plus the magnetic field of the earth along the vertical (y) axes. These currents must be chosen such that:

$$\begin{pmatrix} I_1^y \\ \vdots \\ I_q^y \end{pmatrix} = \frac{2\pi}{\mu_0} MB_y^{-1} \begin{pmatrix} -\frac{\partial (B_y^{earth} + B_y^0)}{\partial y} \\ \vdots \\ -\frac{\partial^n (B_y^{earth} + B_y^0)}{\partial y} \end{pmatrix} \quad (48)$$

Figure 29:
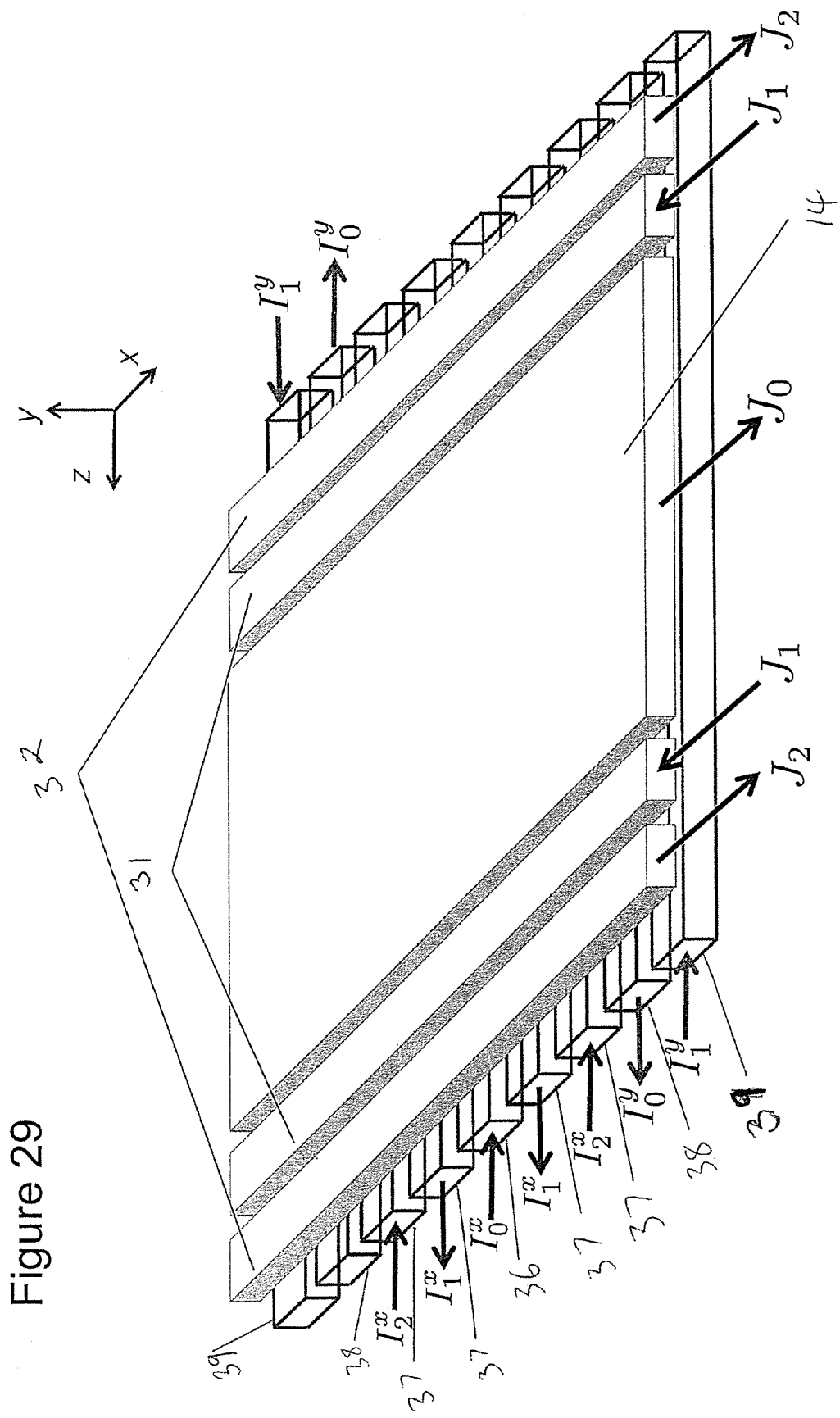
FIG. 29 is a schematic illustration of the magnetic elements for creating the trapping magnetic field and the magnetic elements for eliminating the earth's magnetic field along the $\hat{u}_x$ axes, $B_x^{earth}$ and along the $\hat{u}_y$ axes, $B_y^{earth}$.

Assuming infinitely long thin wires, the magnetic Matrix $MB_y$ of the chip (for the case q=4) is given by:

In equation 49, $d_i$ is the distance of the corresponding shim-wire to the plane x=0 (see FIGS. 28 and 29). It must be noticed that, for simplicity, those figures show only the main compensation pair 38 (for the current $I_0^y$) and one shim-pair 39 (for the current $I_1^y$). This is the minimal configuration for compensating the magnetic field of the earth along the y-axes. Similarly, for the compensation of $B_x^{earth}$, the minimal configuration required is the main compensation element 36 for the current $I_0^x$ plus the first shim-pair 37 for the current $I_1^x$, as shown in FIG. 27.

The magnetic elements for the compensation of the earth's magnetic field can be fabricated with low or high temperature superconductors. The decision depends on the particular application. The field to be compensated is very small: $B_x^{earth} \cong B_y^{earth} \leq 1$ Gauss, therefore no high currents are required. This means that the cross section of the magnetic elements can be very small, of the order of 1 mm² or less. For ease of fabrication, the cross section of all elements should rather be the same. However, eventually different shim-pairs may also have different cross sections. The separation between the different magnetic elements is preferably also of that order of magnitude, around 1 mm or lower, although higher separations would also work.

Figure 30:
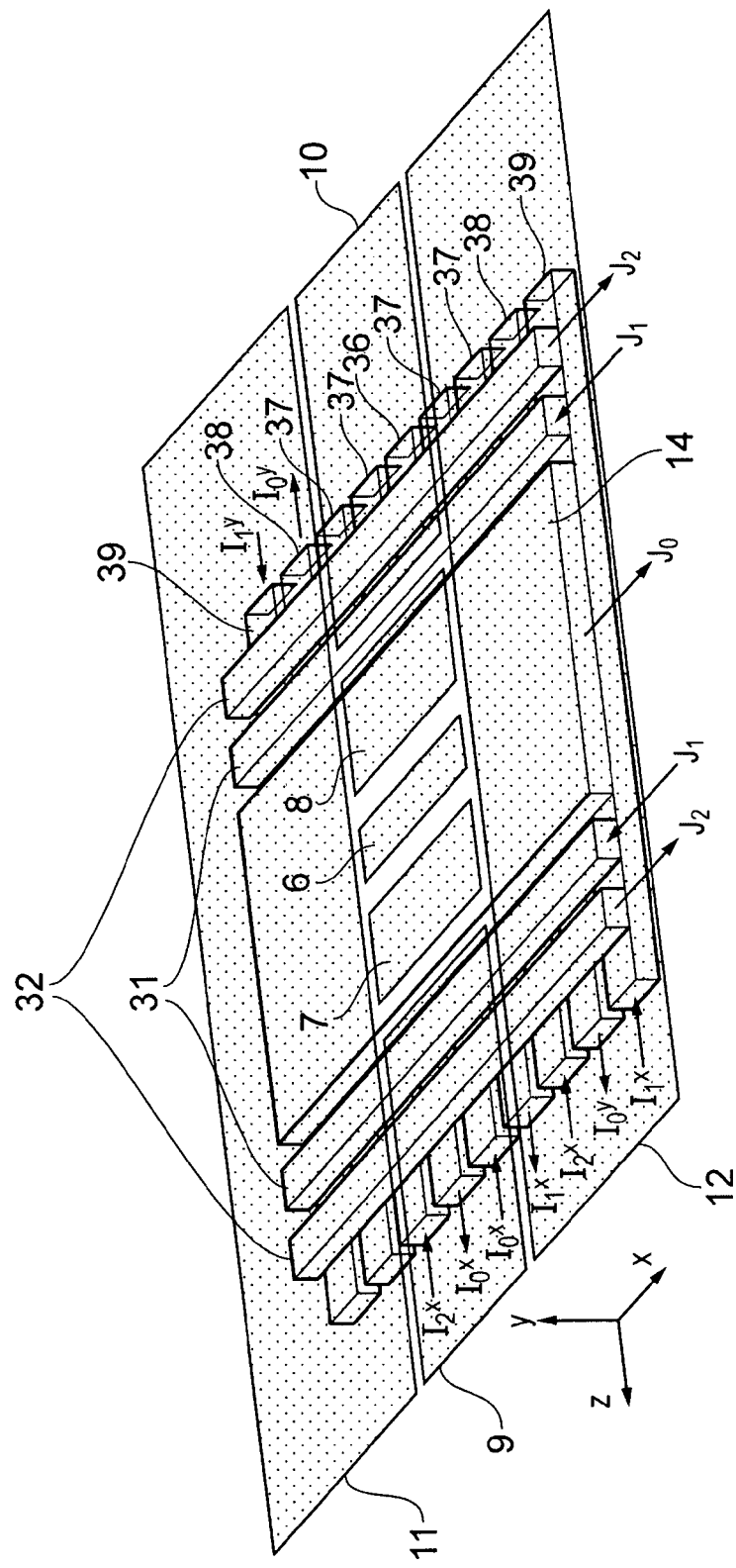
FIG. 30 is a schematic illustration of the complete ion chip, including the electrodes for creating the trapping electrostatic potential, the magnetic elements for creating the trapping magnetic field and the magnetic elements for eliminating the earth's magnetic field along the $\hat{u}_x$ axes, $B_x^{earth}$ and along the $\hat{u}_y$ axes, $B_y^{earth}$.

FIG. 30 shows a complete ion chip, including the electrodes for creating the trapping electrostatic potential, the magnetic elements for creating the trapping magnetic field and the magnetic elements for eliminating the earth's magnetic field along the $\hat{u}_x$ axes, $B_x^{earth}$ and along the $\hat{u}_y$ axes, $B_y^{earth}$.

The distribution of the currents can be different to that shown in the FIGS. 28, 29. For instance, what in FIG. 29 is shown to sustain the current $I_2^x$ may be used instead to sustain $I_0^y$ and vice versa. Since the fabrication of the structure does not exclude any of these different options, the optimal current distribution will be decided by the user, simply by applying the desired current to the desired magnetic element in whatever order is most convenient for him. There is only one exception to this, namely the main magnetic element for compensating $B_x^{earth}$ (see FIG. 27), which can only be used for that purpose: it cannot be used for compensating $B_y^{earth}$. This magnetic element must be parallel to the $\hat{u}_z$-axes, and its symmetry axes should coincide with the plane x=0. The rest of the magnetic elements for the compensation of $B_x^{earth}$ and $B_y^{earth}$ must also be oriented along the $\hat{u}_z$-axes and symmetrically distributed across the plane x=0.

As for the case of the upper magnetic structure for generating the homogenous trapping magnetic field along the z-axes, the superconducting currents or magnetic dipole densities may be applied with techniques described elsewhere as known to the skilled person. It is also necessary that, as seen from the trapping position $(0, y_0, 0)$ the magnetic elements for compensating the earth's magnetic field show only currents propagating along $\hat{u}_z$, with no components along the axis $\hat{u}_x$, $\hat{u}_y$. This is achieved with the use of the superconducting shielding case, as sketched in FIG. 25.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. An ion trap comprising:
    a first array of magnetic elements arranged to generate a first magnetic field with a degree of homogeneity; and
    an array of electrodes arranged to generate an electrostatic field including a turning point in electrical potential at a location where the magnetic field has a substantially maximum degree of homogeneity;
    wherein the array of electrodes is planar and parallel to the direction of the magnetic field at the location; and
    wherein a primary first magnetic element is arranged to generate a first component of the first magnetic field and other first magnetic elements are arranged to generate compensating components of the first magnetic field that reduce the gradient, the curvature and higher order derivatives of the first component of the first magnetic field at the location where the first magnetic field has the substantially maximum degree of homogeneity.

2. The ion trap of claim 1, wherein the electrodes of the array each have surfaces facing the location where the magnetic field is substantially homogeneous, which surfaces are substantially coplanar.

3. The ion trap of claim 1, wherein the array of electrodes comprises a row of three or more electrodes, which row is arranged to be parallel to the direction of the magnetic field at the location where the magnetic field is substantially homogeneous.

4. The ion trap of claim 3, wherein the row comprises five electrodes.

5. The ion trap of claim 3, wherein the lengths of the electrodes along the direction of the row are such that an electrode in the middle of the row is shortest and electrodes at the ends of the row are longest.

6. The ion trap of claim 3, comprising a guard electrode on each side of the row.

7. The ion trap of claim 6, wherein the guard electrodes overlap the electrodes of the row.

8. The ion trap of claim 1, wherein the array of electrodes is provided on a substrate and the array of magnetic elements is provided on the same substrate.

9. The ion trap of claim 8, wherein the electrode array is provided on a top surface of the substrate and the array of magnetic elements is provided below the electrode array.

10. The ion trap of claim 1, wherein the array of magnetic elements comprises a row of magnetic elements, which row extends in the same direction as the row of electrodes.

11. The ion trap of claim 1, wherein the magnetic elements each comprise a wire arranged to conduct an electric current.

12. The ion trap of claim 1, wherein the degree of homogeneity of the magnetic field is predetermined.

13. The ion trap of claim 12, wherein the predetermined degree of homogeneity of the magnetic field is obtained by empirically adjusting the magnetic field of the array of magnetic elements.

14. The ion trap of claim 1, wherein the other first magnetic elements comprise at least one pair of first magnetic elements, the elements within each at least one pair being arranged to have substantially equal currents running therethrough in the same direction.

15. The ion trap of claim 1, further comprising a second array of magnetic elements arranged to compensate for a first component of an external magnetic field.

16. The ion trap of claim 15, wherein the magnetic elements of the second array are substantially perpendicular to the magnetic elements of the first array.

17. The ion trap of claim 15, wherein a primary second magnetic element is arranged to generate a first component of a second magnetic field and other second magnetic elements are arranged to generate compensating components of the second magnetic field that reduce the gradient and curvature of the first component of the second magnetic field and compensate for the first component external magnetic field at the location where the first magnetic field has the substantially maximum degree of homogeneity.

18. The ion trap according to claim 17, wherein the other second magnetic elements comprise at least one pair of second magnetic elements, the elements within each at least one pair being arranged to have substantially equal currents running therethrough in the same direction.

19. The ion trap of claim 15, wherein the external magnetic field is the earth's magnetic field.

20. The ion trap of claim 1, further comprising a third array of magnetic elements arranged to compensate for a second component of an external magnetic field.

21. The ion trap of claim 20, wherein the magnetic elements of the third array are substantially perpendicular to the magnetic elements of the first array.

22. The ion trap of claim 20, wherein third magnetic elements are arranged to generate a third magnetic field to compensate for a second component of the external magnetic field at the location where the first magnetic field has the substantially maximum degree of homogeneity.

23. The ion trap according to claim 22, wherein the third magnetic elements comprise at least one pair of third magnetic element, the elements within each at least one pair being arranged to have substantially equal currents running therethrough in mutually opposite directions.

24. A mass spectrometer comprising the ion trap of claim 1.

25. A microwave quantum circuit comprising the ion trap of claim 1.

26. A method of trapping an ion, the method comprising:
using an array of magnetic elements to generate a magnetic field with a degree of homogeneity; and
using an array of electrodes to generate an electrostatic field including a turning point in electrical potential at a location where the magnetic field has a maximum degree of homogeneity;
wherein the array of electrodes is planar and parallel to the direction of the magnetic field at the location; and
wherein a primary magnetic element is arranged to generate a first component of the magnetic field and other magnetic elements are arranged to generate compensating components of the magnetic field that reduce the gradient, the curvature and higher order derivatives of the first component of the magnetic field at the location where the magnetic field has the substantially maximum degree of homogeneity.

27. The method of claim 26, wherein the degree of homogeneity of the magnetic field is predetermined.

28. The method of claim 27, further comprising obtaining the predetermined degree of homogeneity of the magnetic field by empirically adjusting the magnetic field of the array of magnetic elements.

29. The method of claim 28, wherein empirically adjusting the magnetic field of the array of magnetic elements comprises probing the magnetic field with a magnetic sensor.

30. The method of claim 29, wherein the magnetic sensor is the ion to be trapped.

* * * * *